United States Patent
Karnstedt et al.

(10) Patent No.: US 6,907,479 B2
(45) Date of Patent: Jun. 14, 2005

(54) INTEGRATED CIRCUIT FIFO MEMORY DEVICES THAT ARE DIVISIBLE INTO INDEPENDENT FIFO QUEUES, AND SYSTEMS AND METHODS FOR CONTROLLING SAME

(75) Inventors: Curt A. Karnstedt, Austin, TX (US); Bruce L. Chin, Duluth, GA (US); Prashant Shamarao, Suwanee, GA (US); Mario Montana, Los Gatos, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 517 days.

(21) Appl. No.: 09/944,799

(22) Filed: Aug. 30, 2001

(65) Prior Publication Data

US 2003/0018862 A1 Jan. 23, 2003

Related U.S. Application Data

(60) Provisional application No. 60/306,285, filed on Jul. 18, 2001.

(51) Int. Cl.[7] .............................................. G06F 13/00
(52) U.S. Cl. ............................ 710/52; 710/31; 710/33; 710/51; 710/53; 710/57; 711/101; 711/154; 711/156; 711/170
(58) Field of Search ............................ 710/31, 33, 51, 710/52, 53, 57; 711/101, 154, 147, 150, 156, 170; 370/388, 395

(56) References Cited

U.S. PATENT DOCUMENTS

| 4,750,149 A | 6/1988 | Miller ........................ 364/900 |
| 4,847,812 A | 7/1989 | Lodhi ........................ 365/221 |
| 5,999,478 A | 12/1999 | Proebsting ............. 365/230.05 |
| 6,070,203 A | 5/2000 | Hawkins et al. .............. 710/57 |
| 6,122,274 A | * 9/2000 | Kumar ........................ 370/388 |
| 6,122,717 A | 9/2000 | Chan et al. .................. 711/170 |
| 6,230,249 B1 | 5/2001 | Chan et al. .................. 711/212 |
| 6,233,651 B1 | 5/2001 | O'Neill et al. .............. 711/101 |
| 6,243,799 B1 | 6/2001 | Chan et al. .................. 711/212 |

OTHER PUBLICATIONS

Texas Instruments Incorporated, *4096 × 18 Clocked Multiple–queue (Multi–Q™) First–In, First–Out Memory With Three Programmable–Depth Buffers and Cell–Based Flags*, SN74ACT53861, 1995, 1 page.

U.S. Appl. No. 09/721,478, filed Nov. 22, 2000, Au et al.

* cited by examiner

*Primary Examiner*—Tammara Peyton
(74) *Attorney, Agent, or Firm*—Myers Bigel Sibley & Sajovec

(57) ABSTRACT

Integrated circuit FIFO memory devices may be controlled using a register file, an indexer and a controller. The FIFO memory device includes a FIFO memory that is divisible into up to a predetermined number of independent FIFO queues. The register file includes the predetermined number of words. A respective word is configured to store one or more parameters for a respective one of the FIFO queues. The indexer is configured to index into the register file, to access a respective word that corresponds to a respective FIFO queue that is accessed. The controller is responsive to the respective word that is accessed, and is configured to control access to the respective FIFO queue based upon at least one of the one or more parameters that is stored in the respective word. Thus, as the number of FIFO queues expands, the number of words in the register file may need to expand, but the controller and/or indexer need not change substantially. The register file may include multiple register subfiles, and the controller may include multiple controller subblocks.

40 Claims, 13 Drawing Sheets

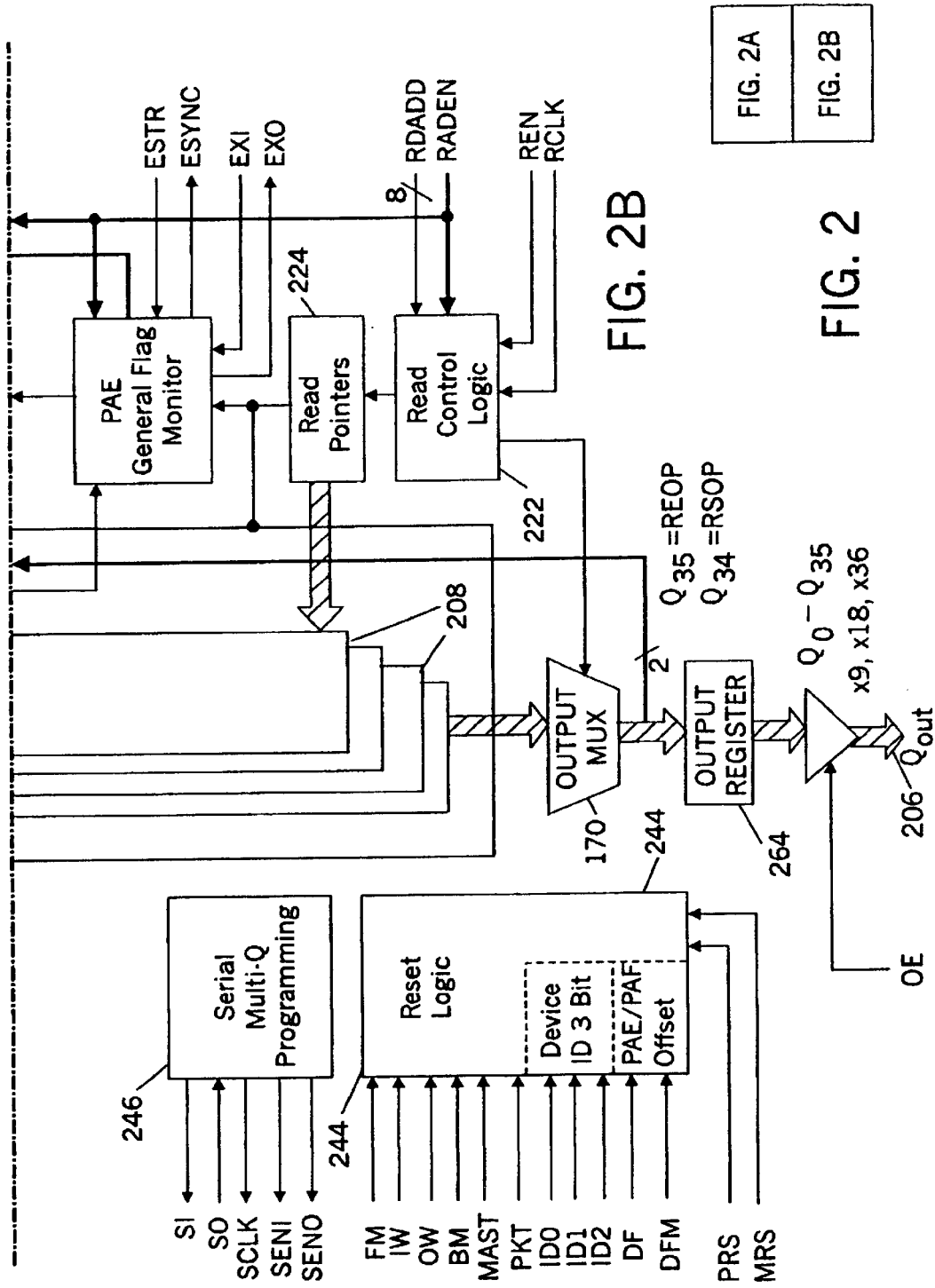

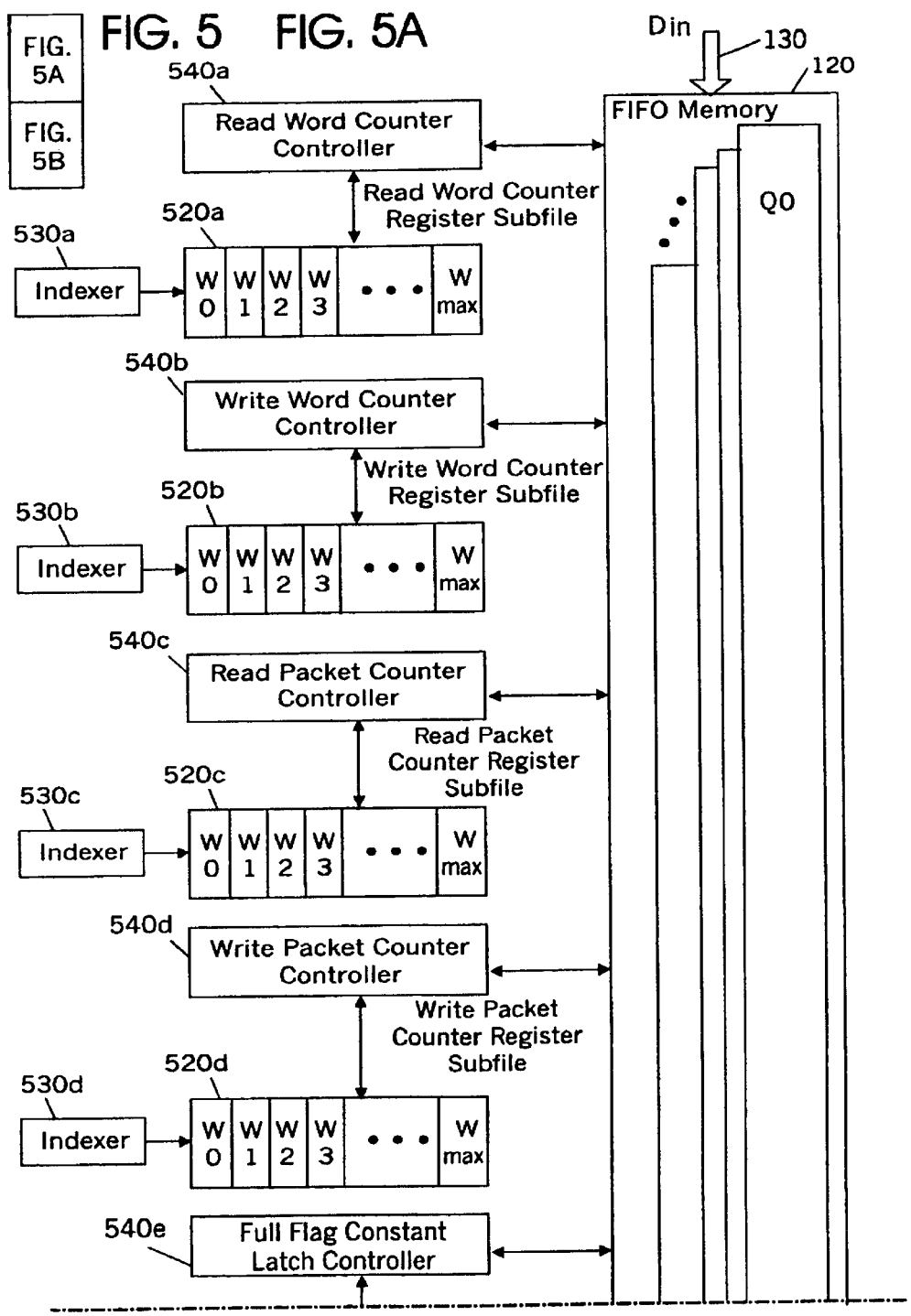

US 6,907,479 B2

INTEGRATED CIRCUIT FIFO MEMORY DEVICES THAT ARE DIVISIBLE INTO INDEPENDENT FIFO QUEUES, AND SYSTEMS AND METHODS FOR CONTROLLING SAME

CROSS REFERENCE TO RELATED APPLICATION

This application claims the benefit of provisional application Ser. No. 60/306,285, filed Jul. 18, 2001, entitled *Scalable Multi-Queue FIFOs And Methods Of Operating Same*, the disclosure of which is hereby incorporated herein by reference in its entirety as if set forth fully herein.

FIELD OF THE INVENTION

This invention relates to integrated circuit memory devices and methods of operating same, and more particularly to integrated circuit First-In First-Out (FIFO) memory devices and methods of operating same.

BACKGROUND OF THE INVENTION

Integrated circuit FIFO memory devices are widely used in consumer and commercial applications. As is well known to those having skill in the art, in a FIFO memory device, data generally is stored in a sequential order as data is written into the device. A FIFO may maintain a write pointer that specifies the location or address to write the next data entry into the FIFO. The write pointer may be incremented for each write operation. A FIFO memory also generally is sequentially read in the same order as it was written. A read pointer may be maintained, and the read pointer also may be incremented for each subsequent read operation. Thus, the data that is first written into a FIFO device generally is also the data that is first read from the FIFO device.

FIFO devices may have many applications, for example as buffer memory. In network applications, FIFOs may be used as a buffer, to store packets of data. Similarly, in telecommunications applications, FIFOs may be used to buffer incoming and/or outgoing signals, such as Time Division Multiple Access (TDMA) radiotelephone communication signals.

FIFO memory devices are described, for example, in U.S. Pat. Nos. 4,750,149 to Miller; 5,999,478 to Proebsting; 6,122,717 to Chan et al.; 6,230,249 to Chan et al.; and 6,243,799 to Chan et al., all of which are assigned to the assignee of the present application, the disclosures of all of which are hereby incorporated herein by reference in their entirety as if set forth fully herein. FIFO memories also are described in U.S. Pat. Nos. 4,847,812 to Lodhi; 6,070,203 to Hawkins et al.; and 6,233,651 to O'Neill et al. Finally, a FIFO memory is described in Product Preview No. SN74ACT53861 entitled 4096×18 *Clocked Multiple-Queue (MultiQ™) First-In, First-Out Memory With Three Programmable-Depth Buffers and Cell-Based Flags*, published by Texas Instruments Incorporated, June 1994.

SUMMARY OF THE INVENTION

Integrated circuit FIFO memory devices according to embodiments of the invention include a FIFO memory, a data input port, a data output port and a FIFO controller that is configured to operate the FIFO memory as from one up to a predetermined number greater than one of independent FIFO queues. A data input system is configured to write input data from the input port into a first selected one of the independent FIFO queues. A data output system is configured to read data from a second selected one of the independent FIFO queues. Accordingly, in a single integrated circuit chip, anywhere between one and the predetermined number, such as up to 32 or more, of discrete FIFO queues can be set up. The individual queue depths also may be set up independent of one another. Once set up, each queue can be operated as an independent FIFO. Data written into the data input port may be directed to a respective queue, for example as directed by a user. Data read from the data output port may be accessed from a respective queue, for example as directed by a user.

In embodiments of integrated circuit FIFO memory devices as described above, the FIFO controller stores therein one or more parameters for each of the up to a predetermined number of independent FIFO queues. The FIFO controller is configured to control writing of the input data into a first selected one of the independent FIFO queues based upon at least one of the one or more parameters that is stored for the first selected one of the independent FIFO queues. The FIFO controller also is configured to control reading of data from a second selected one of the independent FIFO queues, based upon at least one of the one or more parameters that is stored for the selected one of the independent FIFO queues. The one or more parameters may comprise, for example, a number of words read, a number of words written, a number of packets read, a number of packets written, a location of a next word to be read, a location of a next word to be written, a start address and/or an end address for the respective FIFO queue. The one or more parameters also may comprise mask values that are used to generate a full, almost full and/or almost empty flag for the respective FIFO queue.

As described above, integrated circuit FIFO memory devices according to embodiments of the invention may be divisible into up to a large number, such as up to 32 or more, of independent FIFO queues. As such, it may be difficult to provide an on-chip FIFO controller that can handle these multiple independent queues, without itself becoming unduly complex and/or consuming excessive chip real estate. According to other embodiments of the invention that will now be described, integrated circuit FIFO memory devices may be controlled using a register file, an indexer and a controller. More specifically, these embodiments of integrated circuit FIFO memory devices according to the invention include a FIFO memory that is divisible into up to a predetermined number of independent FIFO queues. The register file includes the predetermined number of words. A respective word is configured to store one or more parameters for a respective one of the FIFO queues. The indexer is configured to index into the register file, to access a respective word that corresponds to a respective FIFO queue that is accessed. The controller is responsive to the respective word that is accessed, and is configured to control access to the respective FIFO queue based upon at least one of the one or more parameters that is stored in the respective word. Thus, according to these embodiments, as the number of FIFO queues expands, the number of words in the register file may need to expand, but the controller and/or indexer need not change substantially. By not needing separate controllers for each independent FIFO, increased scalability may be obtained. It will be understood that these embodiments also may be used with FIFO memory devices that include a fixed plurality of queues, to allow, for example, efficient storing of flag masks.

In some embodiments of the invention, the register file may comprise a plurality of register subfiles, each of which includes the predetermined number of words, a respective word of which is configured to store one or more parameters for a respective one of the FIFO queues. The controller may comprise a plurality of controller subblocks, a respective one of which is responsive to the respective word that is accessed in the at least one of the register subfiles, and is configured to control access to the respective FIFO queue based upon at least one of the one or more parameters that is stored in the respective word.

In one embodiment, a read word counter register subfile is provided, including the predetermined number of words, a respective word of which is configured to store a number of words read for the respective one of the FIFO queues. In these embodiments, the controller comprises a read word counter controller subblock that is responsive to the respective word that is accessed in the read word counter register subfile, and that is configured to control reading from the respective FIFO queue based on the number of words read that is stored in the respective word. In other embodiments, the register file comprises a write word counter register subfile, a respective word of which is configured to store a number of words written into a respective one of the FIFO queues, and the controller comprises a write word counter controller subblock.

In yet other embodiments, the register file comprises a read packet counter register subfile, a respective word of which is configured to store a number of packets read for a respective one of the FIFO queues, and the controller comprises a read packet counter controller subblock. In other embodiments, the register file comprises a write packet counter register subfile, a respective word of which is configured to store a number of packets written into a respective one of the FIFO queues, and the controller comprises a write packet counter controller subblock.

In still other embodiments, the register file comprises a full flag constant latch register subfile, a respective word of which is configured to store at least one mask value that is used to generate a full flag for a respective one of the FIFO queues, and the controller comprises a full flag constant latch controller subblock. In other embodiments, the register file comprises a programmable almost full flag constant latch register subfile, a respective word of which is configured to store at least one mask value that is used to generate a programmable almost full flag for a respective one of the FIFO queues, and the controller comprises a programmable, almost full flag constant latch controller subblock. In other embodiments, the register file comprises a programmable almost empty constant latch register subfile, a respective word of which is configured to store at least one mask value that is used to generate a programmable almost empty flag for a respective one of the FIFO queues, and the controller comprises a programmable almost empty flag constant latch controller subblock.

In still other embodiments, the register file comprises a read data path counter register subfile, a respective word of which is configured to store a physical memory location of a next word to be read for a respective one of the FIFO queues, and the controller comprises a read data path counter controller subblock. In other embodiments, the register file comprises a write data path counter register subfile, a respective word of which is configured to store a physical memory location of a next word to be written for a respective one of the FIFO queues, and the controller comprises a write data path counter controller subblock.

Finally, in other embodiments, the register file comprises a start/end register subfile, a respective word of which is configured to store physical memory locations of a start and an end of a respective one of the FIFO queues, and the controller comprises a start/end controller subblock.

Accordingly, integrated circuit FIFO memory devices can be divisible into up to a predetermined number of independent FIFO queues, the parameters of each of which can be controlled independently, while maintaining scalability. It will be understood that although the above embodiments have primarily been described with respect to systems, analogous method embodiments also may be provided.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element is referred to as being "connected to" another element, it can be directly connected to the other element or intervening elements may also be present. In contrast, when an element is referred to as being "directly connected to" another element, there are no intervening elements present.

Figure 1:
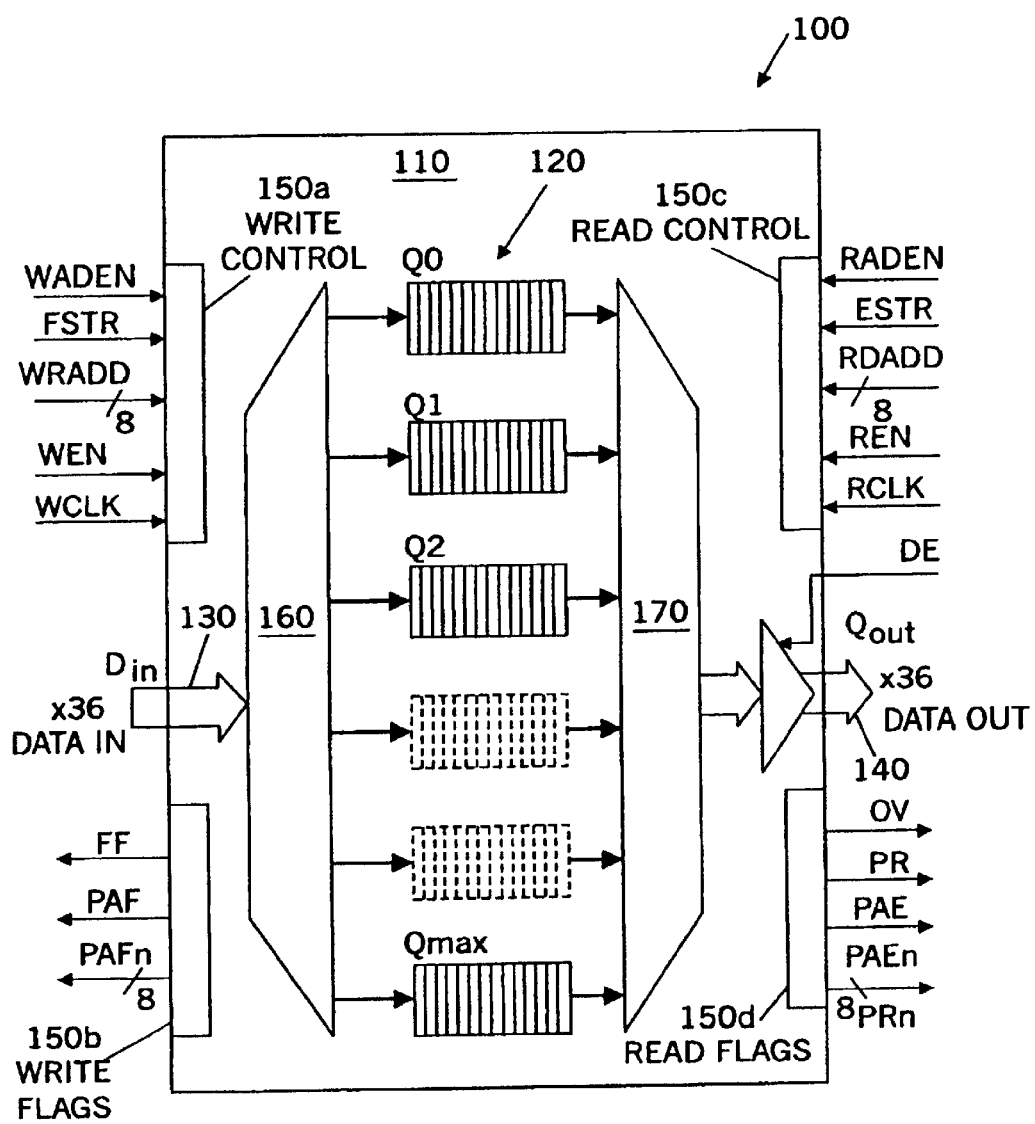
FIGS. 1–9 and 13–14 are block diagrams of integrated circuit FIFO memory devices and methods according to embodiments of the invention.

FIG. 1 is a block diagram of integrated circuit FIFO memory devices and methods according to embodiments of the present invention. As shown in FIG. 1, integrated circuit FIFO memory devices 100 include an integrated circuit substrate 110, such as a silicon semiconductor substrate and a FIFO memory 120 in the integrated circuit memory substrate. A data input port 130, also referred to as $D_{in}$, and a data output port 140, also referred to as $Q_{out}$ are provided. A FIFO controller that may include a separate write control block 150a, write flag block 150b, read control block 150c and read flag block 150d also is provided. It will be understood, however, that any or all of these blocks 150a–150d may be integrated into one or more controllers. The FIFO controller is configured to operate the FIFO memory 120 as from one up to a predetermined number of independent FIFO queues labeled Q0–Qmax in FIG. 1.

It will be understood that the FIFO memory 120 may be embodied as any conventional FIFO memory. Moreover, in order to allow, for example, fast fall-through capability and/or extended data capacity, the FIFO memory 120 may include an embedded memory and at least one multi-port cache memory, such as described, for example, in U.S. patent application Ser. No. 09/721,478, filed Nov. 22, 2000, entitled *Integrated Circuit Memory Devices Having Multi-Port Cache Arrays Therein and Methods of Operating Same*, to Au et al., assigned to the assignee of the present application, the disclosure of which is hereby incorporated herein by reference in its entirety as if set forth fully herein.

Finally, still referring to FIG. 1, a demultiplexer 160, such as a data input demultiplexer, is configured to write input data from the input port 130 into a first selected one of the independent FIFO queues Q0–Qmax, and a multiplexer 170, such as a data output multiplexer, is configured to read data from a second selected one of the independent FIFO queues Q0–Qmax, to the data output port 140.

Thus, embodiments of the invention as illustrated in FIG. 1 can provide a single integrated circuit chip 110 within which anywhere between, for example, 1 and 32 discrete FIFO queues Q0–Qmax can be set up. The queues within the device 100 have a common input bus (input or write port 130), and a common data output bus (output or read port 140). Data written into the write port 130 is directed to a respective queue Q0–Qmax via an internal demultiplex operation that may be addressed by the user using the demultiplexer 160. Data read from the read port 140 is accessed from a respective queue Q0–Qmax via an internal multiplex operation that may be addressed by the user using the multiplexer 170. In some embodiments, data writes and reads can be performed at high speeds up to 166 MHz, with access times of 3.7 ns. Data write and read operations may be totally independent of each other. Thus, a queue may be selected on the write port and a different queue on the read port. Alternatively, both ports may select the same queue simultaneously. Thus, the first and second selected queues 120 may be identical or different.

Additional description of embodiments of devices 100 now will be provided. A device 100 can provide Full flag and Output Valid (OV) and/or Empty flag status for the queue selected for write and read operations, respectively. Also a Programmable Almost Full (PAF) and Programmable Almost Empty (PAE) flag for each queue may be provided. Two programmable flag busses may provide status of queues not selected for write or read operations. These busses may be, for example, 8 bits wide. When 8 or fewer queues are configured in the device 100, these flag busses can provide an individual flag per queue. When more than 8 queues are used, either a polled or direct mode of bus operation can provide the flag busses with the status of all queues.

Bus Matching may be provided between the data input port 130 and the data output port 140. In one embodiment, either port can be 9 bits, 18 bits or 36 bits wide provided that at least one port is 36 bits wide.

A packet ready mode of operation also may be provided when the device is configured for 36 bit data input and 36 bit data output port sizes. The packet ready mode can provide a flag output indicating when at least one packet of data within a queue is available for reading. This mode also can mark the start and end of packets of data being passed through the FIFO queues. The device can provide an internally generated packet ready status per queue.

A user can have full flexibility configuring queues within the device, such that the total number of queues can be, for example, between 1 and 32, with the individual queue depths being independent of each other. The programmable flag positions also can be user programmable. All programming can be performed via a dedicated serial port. A default option also may be available that configures the device in a predetermined manner.

Both a master reset and partial reset may be provided. A master reset latches in all configuration setup pins and may be performed before programming of the device can take place. A partial reset can reset the read and write pointers of an individual FIFO queue, provided that the queue is selected on both the write port and read port at the time of partial reset.

Figure 2A:
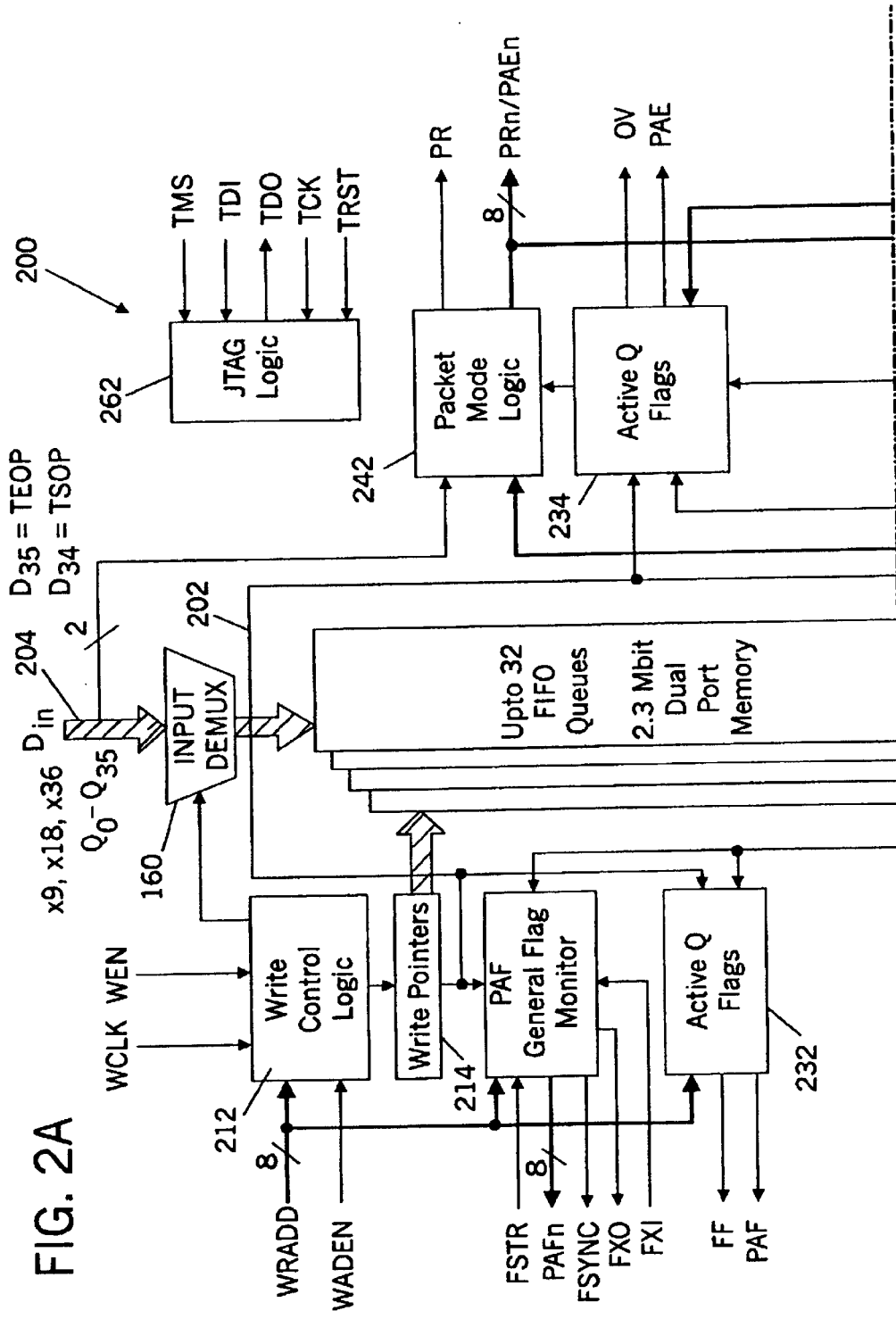

FIG. 2 is a functional block diagram of other embodiments of integrated circuit FIFO memory devices and methods 200 according to the present invention. Referring now to FIG. 2, a FIFO memory 202 is organized into blocks, each block being, for example, 256×36 bits. When a user is configuring the number of queues and individual queue sizes, the user allocates the memory to respective queues 208, in units of blocks. A single queue 208 can be made up from 0 to m blocks, where m is the total number of blocks available within a device. Also the total size of any given queue is in increments of 256×36. Thus, queues 208 can be built from these blocks to make any size queue desired and any number of queues desired.

The input port 204 is common to all FIFO queues 208 within the device 200, as is the output port 206. The device provides the user with bus matching options such that the input port and output port can be, for example, either ×9, ×18 or ×36 bits wide. The read and write port widths are set independently of one another. In these embodiments, because the ports are common to all queues, the width of the queues is not individually set, so that the input width of all queues are equal and the output width of all queues are equal.

Data being written into the device 200 via the input port 204 is directed to a discrete FIFO queue 208 via the write queue select address inputs using write control logic 212 and write pointers 214. Conversely, data being read from the device read port is read from a queue selected via the read queue select address inputs using read control logic 222 and read pointers 224. Data can be simultaneously written into and read from the same FIFO queue or different FIFO queues. Once a queue is selected for data writes or reads, the writing and reading operation is performed in the same manner as conventional synchronous FIFO's, utilizing clocks and enables. There is a single clock and enable per port. When a specific queue is addressed on the write port, data placed on the data inputs is written to that queue, sequentially, based on the rising edge of a write clock WCLK, provided setup and hold times are met. Conversely, data is read to the output port after an access time from a rising edge on a read clock RCLK.

The operation of the write port may be comparable to the function of a conventional FIFO operating in a standard mode. Write operations can be performed on the write port provided that the queue currently selected is not full. A full flag output $\overline{\text{FF}}$ from the active Q flags 232 provides status of the selected queue. The operation of the read port also may be comparable to the function of a conventional FIFO. When a FIFO queue is selected on the output port, the next word in that queue will automatically fall through to the output register 264. All subsequent words from that queue may require an enabled read cycle. Data cannot be read from a selected queue if that queue is empty. The read port provides an output valid ($\overline{\text{OV}}$) flag from the active Q flags 234, indicating when data read out is valid. If the user switches to a queue that is empty, the last word from the previous queue will remain on the output register.

As mentioned, the write port has a full flag $\overline{\text{FF}}$, providing full status of the selected queue. Along with the full flag, a dedicated programmable almost full flag $\overline{\text{PAF}}$ is provided. This almost full flag can be similar to an almost full flag of a conventional FIFO. The device 200 provides a user programmable almost full flag for all 32 FIFO queues and when a respective queue is selected on the write port, the almost full flag provides status for that queue. Conversely, the read port has an output valid flag $\overline{\text{OV}}$, providing status of the data being read from the queue selected on the read port. As well as the output valid flag, the device provides a dedicated programmable almost empty flag $\overline{\text{PAE}}$. This almost empty flag can be similar to the almost empty flag of a conventional FIFO. The device provides a user programmable almost empty flag for all 32 FIFO queues and when a respective queue is selected on the read port, the almost empty flag provides status for that queue.

In addition to these dedicated flags, full and almost full on the write port and output valid and almost empty on the read port, there are two flag status busses. An almost full flag status bus is provided. This bus is 8 bits wide. Also, an almost empty flag status bus is provided. Again, this bus is 8 bits wide. These flag busses allow a user to monitor the data levels within FIFO queues that may not be selected on the write or read port. The device provides almost full and almost empty registers (programmable by the user) for each of the 32 FIFO queues in the device.

The user has the option of utilizing anywhere between 1 and 32 FIFO queues 208. Therefore, the 8 bit flag status busses are multiplexed between the 32 queues. A flag bus provides status for 8 of the 32 queues at any given time. This is referred to as a "quadrant", such that when the bus is providing status of queues 1 through 8, this is quadrant 1, when it is queues 9 through 16, this is quadrant 2 and so on up to quadrant 4. If fewer than 32 queues are set up in the device, there are still 4 quadrants, such that in "polled" mode of operation the flag bus will still cycle through 4 quadrants. If for example only 22 queues are set up, quadrants 1 and 2 will reflect status of queues 1 through 8 and 9 through 16 respectively. Quadrant 3 will reflect the status of queues 17 through 22 on the least significant 6 bits, the most significant 2 bits of the flag bus are don't care and the $4^{th}$ quadrant outputs will also be don't care.

The flag busses are available in two user selectable modes of operation, "polled" or "direct". When operating in polled mode, a flag bus provides status of each quadrant sequentially. That is, on each rising edge of a clock the flag bus is updated to show the status of each quadrant in order. A rising edge of the write clock will update the almost full bus and a rising edge on the read clock will update the almost empty bus. The mode of operation is the same for both the almost full and almost empty flag busses. When operating in direct mode, the quadrant on the flag bus is selected by the user. In order to allow a user to actually address the quadrant to be placed on the flag status busses, these flag busses operate independently of one another. Addressing of the almost full flag bus is performed via the write port and addressing of the almost empty flag bus is performed via the read port.

The FIFO memory device also offers a "packet ready" mode of operation using packet mode logic 242. This mode is user-selectable and may require that the device 200 be configured with both write and read ports as 36 bits wide. The packet mode of operation provides monitoring of user marked locations. When the user is writing data into a FIFO queue a word being written in can be marked as a "Start of Packet" or "End of Packet". Internally as words are being written into the device 200 with markers attached, the device monitors these markers and provides a packet ready status flag, which indicates when at least one full packet is available in a queue. The read port therefore includes an additional status flag, packet ready $\overline{PR}$. This flag provides packet ready status for the queue currently selected on the read port for read operations, indicating when at least one (or more) packets of data are available to be read. When in packet ready mode the almost empty flag status bus no longer provides almost empty status for individual quadrants, but instead provides packet ready flag status for individual quadrants. A packet is regarded as any number of words written between a start of packet and an end of packet marker. Packet sizes are user defined and sizes are not controlled or limited by the device 200.

Expansion of integrated circuit FIFO memory devices 200 is also possible. Up to 8 devices 200 can be connected in a parallel fashion in a second level package such as a board, providing the possibility of both depth expansion or queue expansion. Depth expansion can expand the depths of individual queues. Queue expansion can increase the total number of queues available. Depth expansion is possible by virtue of the fact that more memory blocks within an integrated circuit FIFO memory device can be allocated per queue, to increase the depth of a queue. For example, depth expansion of 8 devices provides the possibility of 8 queues of 64K×36 deep, each queue being set up within a single device utilizing all memory blocks available to produce a single queue. This is the deepest FIFO queue that can be set up within a device.

For queue expansion, a maximum number of 256 (8×32) queues may be set up, each queue being 2K×36 deep. If fewer queues are set up, then more memory blocks will be available to increase queue depths if desired. When connecting integrated circuit FIFO memory devices in expansion mode all respective input pins (data and control) and output pins (data and flags), may be connected together between individual devices.

A master reset is performed using reset logic 244 by toggling the $\overline{MRS}$ input from HIGH to LOW to HIGH. During a master reset, all internal device setup and control registers are initialized and may be programmed either by the user via the serial port 246, or using default settings. Once a master reset has taken place, the device 200 should be programmed either serially or via the default method before any FIFO read/write operations can begin.

A partial reset allows a user to reset both the read and write pointers of a single queue that has been set up. Before a partial reset can take place on a queue, the respective queue is selected on both the read port and write port, a minimum of 2 RCLK and 2 WCLK cycles before the $\overline{PRS}$ goes LOW. The partial reset is then performed by toggling the $\overline{PRS}$ input from HIGH to LOW to HIGH, maintaining the LOW state for at least one WCLK and one RCLK cycle. Once a partial reset has taken place, a minimum of 3 WCLK and 3 RCLK cycles occur before enabled writes or reads can occur. A partial reset only resets the read and write pointers of a given queue. A partial reset will not effect the overall configuration and setup of the device 200 and its queues 208.

A JTAG test port 262 also may be provided. The FIFO device 200 has a fully functional Boundary Scan feature, compliant with IEEE 1449.1 Standard Test Access Port and Boundary Scan Architecture.

A more detailed description of some of the blocks of FIG. 2 now will be provided. The device 200 of FIG. 2 is a fully programmable device, providing the user with flexibility in how FIFO queues 208 are configured in terms of the number of queues, depth of each queue and position of the $\overline{PAF}/\overline{PAE}$ flags within respective queues. All user programming is done via the serial port 246 after a master reset has taken place. Internally the device has setup registers which are serially loaded. These registers contain values for every queue within the device, such as the depth and $\overline{PAE}/\overline{PAF}$ offset values. The devices are capable of up to 32 queues and therefore contain 32 sets of registers for the setup of each queue.

During a master reset, if the DFM (Default Mode) input is LOW, then the device can be programmed by a user. Once the master reset is complete and $\overline{MRS}$ is HIGH, the device can be serially loaded. Data present on the SI (serial in) input is loaded into the serial port on a rising edge of SCLK (serial clock), provided that $\overline{\text{SENI}}$ (serial in enable), is LOW. Once serial programming or default programming is complete, $\overline{\text{SENI}}$ is bypassed to $\overline{\text{SENO}}$ and SI is bypassed to SO. In particular, $\overline{\text{SENO}}$ starts at high after master reset. The user sets $\overline{\text{SENI}}$ to low to carry out serial programming. Once programming is complete and $\overline{\text{SENI}}$ gets bypassed to $\overline{\text{SENO}}$, it appears on the output that $\overline{\text{SENO}}$ is driven high to low. Upon detection of completion of programming, the user can cease all programming and take $\overline{\text{SENI}}$ inactive, HIGH.

If devices are being used in expansion mode the serial ports of devices should be cascaded. The user can load all devices via the serial input port control pins, SI and $\overline{\text{SENI}}$, of the first device in the chain. The $\overline{\text{SENO}}$ and SO (serial out) of the first device should be connected to the $\overline{\text{SENI}}$ and SI inputs of the second device respectively and so on, with the $\overline{\text{SENO}}$ and SO outputs connecting to the $\overline{\text{SENI}}$ and SI inputs of all devices through the chain. All devices in the chain can be connected to a common SCLK. The serial output port of the final device should be monitored. When $\overline{\text{SENO}}$ of the final device goes LOW, this indicates that serial programming of all devices has been successfully completed. Upon detection of completion of programming, the user can cease all programming and take $\overline{\text{SENI}}$ of the first device in the chain inactive, HIGH.

As mentioned, the first device in the chain has its serial input port controlled by the user. This is the first device to have its internal registers serially loaded by the serial bit stream. When programming of this device is complete it will take its $\overline{\text{SENO}}$ output LOW and bypass the serial data loaded on the SI input to its SO output. The serial input of the second device in the chain is now loaded with the data from the SO of the first device, while the second device has its $\overline{\text{SENI}}$ input LOW. This process continues through the chain until all devices are programmed and the $\overline{\text{SENO}}$ of the final device goes LOW. Once all serial programming has been successfully completed, normal operations, (queue selections on the read and write ports) may begin.

During a master reset, if the DFM (Default Mode) input is HIGH, the device will be configured for default programming. Default programming provides a user with a simpler, but potentially limited, techniques by which to set up the device 200, rather than using serial programming. The default mode will configure a device such that the maximum number of queues possible are setup, with all of the parts available memory blocks being allocated equally between the queues. The values of the $\overline{\text{PAE}}/\overline{\text{PAF}}$ offsets is determined by the state of the DF (default) pin during a master reset. In one example, the default mode will set up 32 queues, each queue being 1024×36 or 2048×36 deep. The value of the $\overline{\text{PAE}}/\overline{\text{PAF}}$ offsets is determined at master reset by the state of the DF input. If DF is LOW then both the $\overline{\text{PAE}}$ & $\overline{\text{PAF}}$ offset will be 8, if HIGH then the value is 128.

When devices 200 are connected in expansion mode, the user can also utilize default programming. Here the serial port is redundant, the $\overline{\text{SENI}}$ input should be tied LOW and the user applies 1064 WCLK cycles, default programming all devices simultaneously. Again, all devices will be configured with the maximum number of queues.

The FIFO devices have up to 32 FIFO queues that data can be written into via a common write port using the data inputs, Din, write clock, WCLK and write enable, $\overline{\text{WEN}}$. The queue address present on the write address bus, WRADD during a rising edge on WCLK while write address enable, WADEN is HIGH, is the queue selected for write operations. The state of $\overline{\text{WEN}}$ is don't care during the write queue selection cycle. The queue selection only has to be made on a single WCLK cycle. This will remain the selected queue until another queue is selected. The selected queue is always the last queue selected.

The write control logic 212 is designed such that 100% bus utilization can be obtained. This means that data can be written into the device on every WCLK rising edge including the cycle that a new queue is being addressed. A queue to be written to need only be selected on a single rising edge of WCLK. All subsequent writes will be written to that queue until a new queue is selected. A minimum of 2 WCLK cycles may need to occur between queue selections on the write port. On the next WCLK rising edge the write port discrete full flag will update to show the full status of the newly selected queue. On the second rising edge of WCLK, data present on the data input bus 204 can be written into the newly selected FIFO queue provided that $\overline{\text{WEN}}$ is LOW and the new queue is not full. The cycle of the queue selection and the next cycle will continue to write data present on the data input bus 204 into the previous queue provided that $\overline{\text{WEN}}$ is active LOW.

In a 32 queue device, the WRADD address bus is 8 bits wide. The least significant 5 bits are used to address one of the 32 available queues within a single device. The most significant 3 bits are used when a device is connected in expansion mode. Up to 8 devices can be connected in expansion, each device having its own 3 bit address. The selected device is the one for which the address matches a 3 bit ID code.

The FIFO device has up to 32 FIFO queues that data is read from via a common read port 206 using the data outputs, Qout, read clock, RCLK and read enable, $\overline{\text{REN}}$. An output enable, $\overline{\text{OE}}$ control pin is also provided to allow high-impedance selection of the data outputs 206. The device read port operates in a mode similar to "first word fall through" on a traditional FIFO, but can add data output pipelining. This data pipelining on the output port allows a user to achieve 100% bus utilization, which is the ability to read out a data word on every rising edge of RCLK regardless of whether a new queue is being selected for read operations.

The queue address present on the read address bus, RDADD during a rising edge on RCLK while read address enable, RADEN is HIGH, is the queue selected for read operations. A queue to be read from need only be selected on a single rising edge of RCLK. All subsequent reads will be read from that queue until a new queue is selected. A minimum of 2 RCLK cycles may need to occur between queue selections on the read port. Data from the newly selected queue will be present on the Qout outputs after 2 RCLK cycles plus an access time, provided that $\overline{\text{OE}}$ is active, LOW. On the same RCLK rising edge that the new queue is selected, data can still be read from the previously selected queue, provided that $\overline{\text{REN}}$ is LOW, active and the previous queue is not empty.

In some embodiments, when a queue is selected on the read port, the next word available in that queue (provided that the queue is not empty), will fall through to the output register 264 after 2 RCLK cycles. As already mentioned, in the previous 2 RCLK cycles to the new data being available, data can still be read from the previous queue, provided that the queue is not empty. At the point of queue selection, the 2-stage internal data pipeline is loaded with the last word from the previous queue and the next word from the new queue. Both these words will fall through to the output register 204 consecutively upon selection of the new queue. In other embodiments, this fall through need not be provided.

The RDADD bus is also used in conjunction with ESTR (almost empty flag bus strobe), to address the almost empty flag bus quadrant during direct mode of operation. In the 32 queue device the RDADD address bus is 8 bits wide. The least significant 5 bits are used to address one of the 32 available queues within a single device. The most significant 3 bits are used when a device is connected in expansion mode.

Pipelining of data to the output port 206 enables the device to provide 100% bus utilization. Data can be read out of the FIFO on every RCLK cycle regardless of queue switches or other operations. The device architecture is such that the pipeline is constantly filled with the next words in a selected queue to be read out, again providing 100% bus utilization and high speed operation. This type of architecture may assume that the user is constantly switching queues such that during a queue switch, the last data words required from the previous queue are forced through the pipeline to the output.

Stated differently, if a user is reading from a queue and wishes to stop reading from that queue and do nothing, the pipeline will have the next word in that queue available in the pipeline. If the user now switches to another queue the first data out of the pipeline will be the word from the previous queue. If the user has no new queue to switch to, the next data word from the current queue will be sitting in the pipeline. This word may need to be forced out through the pipeline. Note, that if reads cease at the empty boundary of a queue, then the last word will automatically be forced through the pipeline to the outputs.

If the user does not want to bring words from a queue into the pipeline after a read operation within a specific queue has ended, there can be two options to force the last required word out of the pipeline without filling the pipeline with new data. The first option is to "double pump" data when writing the data into the given FIFO queue. This essentially means performing two writes of the last word of a given section of data to be read out. A second option is the Null Q select. This option allows the user to force the last required data words from a queue through the pipeline, while maintaining 100% bus utilization. Alternatively, a NULL pin can be asserted to make a switch to a null queue.

The Full flag and Almost Full flag operation is based on writes and reads of data widths determined by the write port width. For example, if the input port is x36 and the output port is x9, then four data reads from a full queue will cause the full flag to go HIGH (queue not full). Conversely, the Output Valid flag and Almost Empty flag operations are always based on writes and reads of data widths determined by the read port. For example, if the input port is x18 and the output port is x36, two write operations will cause the output valid flag of an empty queue to go LOW, output valid (queue is not empty).

Note that the input port serves all queues within a device, as does the output port. Therefore, the input bus width to all queues is equal (determined by the input port size) and the output bus width from all queues is equal (determined by the output port size).

The FIFO device 200 provides a single Full Flag output, $\overline{FF}$. The $\overline{FF}$ flag output provides a full status of the FIFO queue currently selected on the write port for write operations. Internally, the FIFO monitors and maintains a status of the full condition of all queues within it. However, only the queue that is selected for write operations has its full status output to the $\overline{FF}$ flag. This dedicated flag is often referred to as the active queue full flag.

When queue switches are being made on the write port, the $\overline{FF}$ flag output will switch to the new queue and provide the user with the new queue status, on the cycle after a new queue selection is made. The user then has a full status for the new queue one cycle ahead of the WCLK rising edge that data can be written into the new queue. This can prevent the user from writing data to a FIFO queue that is full, assuming that a queue switch has been made to a queue that is actually full.

The $\overline{FF}$ flag is synchronous to the WCLK and transitions of the $\overline{FF}$ flag occur based on a rising edge of WCLK. Internally the device monitors and keeps a record of the full status for all queues. It is possible that the status of a $\overline{FF}$ flag may be changing internally even though that flag is not the active queue flag (selected on the write port). A queue selected on the read port may experience a change of its internal full flag status based on read operations.

The FIFO device 200 provides a single Output Valid flag output, $\overline{OV}$. The $\overline{OV}$ provides an empty status or data output valid status for the data word currently available on the output register of the read port. The rising edge of an RCLK cycle that places new data onto the output register of the read port, also updates the $\overline{OV}$ flag to show whether or not that new data word is actually valid. Internally the FIFO monitors and maintains a status of the empty condition of all queues within it, however only the queue that is selected for read operations has its output valid (empty) status output to the $\overline{OV}$ flag, giving a valid status for the word being read at that time.

When queue switches are being made on the read port, the $\overline{OV}$ flag will switch to show status of the new queue in line with the data output from the new queue. When a queue selection is made the first data from that queue will appear on the Qout data outputs 2 RCLK cycles later, the $\overline{OV}$ will change state to indicate validity of the data from the newly selected queue on this second RCLK cycle also. The previous cycles will continue to output data from the previous queue and the $\overline{OV}$ flag will indicate the status of those outputs. Again, the $\overline{OV}$ flag always indicates status for the data currently present on the output register.

The FIFO device 200 also provides a single Programmable Almost Full flag output, $\overline{PAF}$. The $\overline{PAF}$ flag output provides a status of the almost full condition for the active queue currently selected on the write port for write operations. Internally, the FIFO monitors and maintains a status of the almost full condition of all queues within it, however only the queue that is selected for write operations has its full status output to the $\overline{PAF}$ flag. This dedicated flag is often referred to as the "active queue almost full flag". The position of the $\overline{PAF}$ flag boundary within a FIFO queue can be at any point within that queues depth. This location can be user programmed via the serial port or one of the default values (8 or 128) can be selected if the user has performed default programming.

As already mentioned, every queue within a device has its own almost full status. When a queue is selected on the write port, this status is output via the $\overline{PAF}$ flag. The $\overline{PAF}$ flag value for each queue is programmed during device programming (along with the number of queues, queue depths and almost empty values). The $\overline{PAF}$ offset value, m, for a respective queue can be programmed to be anywhere between '0' and 'D', where 'D' is the total memory depth for that queue. The $\overline{PAF}$ value of different queues within the same device can be different values.

As also previously mentioned, the FIFO device 200 provides a single Programmable Almost Empty flag output, $\overline{PAE}$. The $\overline{PAE}$ flag output provides a status of the almost empty condition for the active queue currently selected on the read port for read operations. Internally, the FIFO monitors and maintains a status of the almost empty condition of all queues within it, however only the queue that is selected for read operations has its empty status output to the $\overline{PAE}$ flag. This dedicated flag is often referred to as the "active queue almost empty flag". The position of the $\overline{PAE}$ flag boundary within a FIFO queue can be at any point within that queues depth. This location can be user programmed via the serial port or one of the default values (8 or 128) can be selected if the user has performed default programming.

As mentioned, every queue within a device has its own almost empty status. When a queue is selected on the read port, this status is output via the $\overline{PAE}$ flag. The $\overline{PAE}$ flag value for each queue is programmed during device programming (along with the number of queues, queue depths and almost full values). The $\overline{PAE}$ offset value, n, for a respective queue can be programmed to be anywhere between '0' and 'D', where 'D' is the total memory depth for that queue. The $\overline{PAE}$ value of different queues within the same device can be different values.

The FIFO device 200 also can provide a Packet Ready feature. During a Master Reset the state of the PKT input (packet ready mode select), determines whether the device will operate in packet ready mode. A discrete flag output $\overline{PR}$, provides a packet ready status of the active queue, selected on the read port. A packet ready status is maintained for all queues, however only the queue selected on the read port has its packet ready status output to the active $\overline{PR}$ flag. The $\overline{PR}$ output flag for the active queue on the read port, is LOW whenever the active queue has one or more full packets of data within its queue, available for reading. If less than a full packet is available then the $\overline{PR}$ flag will be HIGH, packet not ready.

Figure 3:
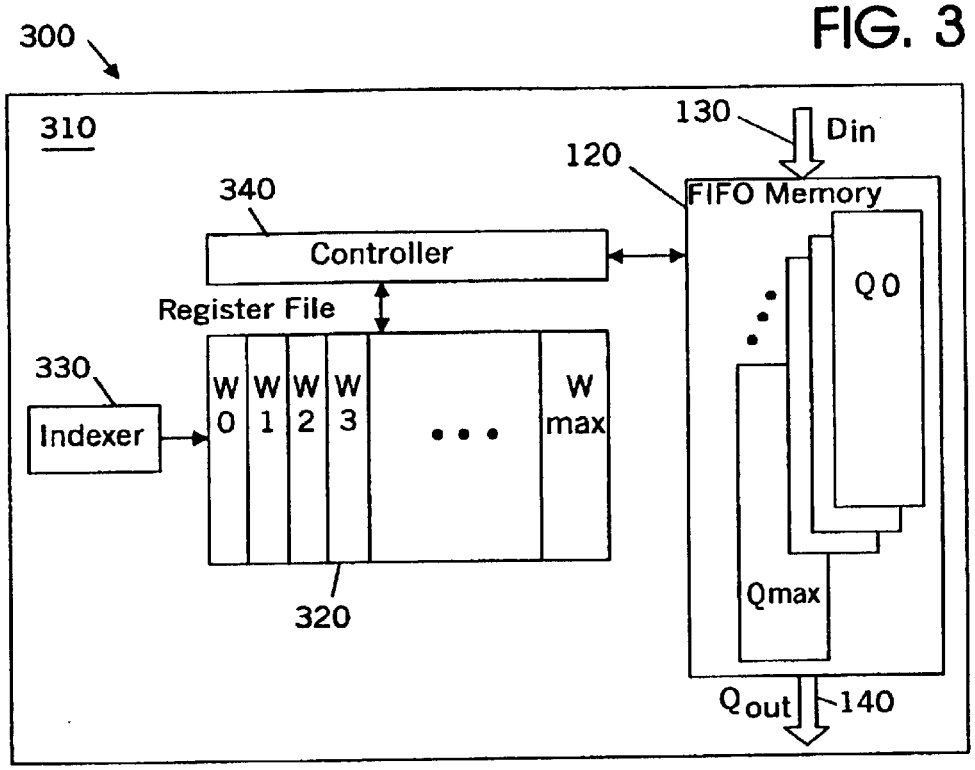

FIG. 3 is a block diagram of integrated circuit FIFO memory devices according to other embodiments of the invention. As shown in FIG. 3, these embodiments of FIFO devices 300 include an integrated circuit substrate 310, such as a silicon semiconductor substrate, that includes therein a FIFO memory 120 that is divisible into up to a predetermined number of independent FIFO queues. In embodiments of FIG. 3, the FIFO memory 120 is shown as being divisible into from one up to a predetermined number of independent FIFO queues Q0–Qmax. A data input port 130 and a data output port 140 also are provided.

Still referring to FIG. 3, a register file 320 also is provided, including the predetermined number of words Wmax. A respective word of the register file 320 is configured to store one or more parameters for a respective one of the FIFO queues Q0–Qmax. It will be understood by those having skill in the art that the register file may be provided using any conventional form of memory, such as Dynamic Random Access Memory (DRAM), Static Random Access Memory (SRAM), Programmable Read Only Memory (PROM), Erasable Programmable Read Only Memory (EPROM) and/or other types of conventional solid state memory. It also will be understood that the term "word" is used to indicate a group of bits that can be accessed as a unit, and may extend in one or more rows or one or more columns of the register file.

Still referring to FIG. 3, an indexer 330 is configured to index or address into the register file 320, to access a respective word W0–Wmax, that corresponds to a respective FIFO queue Q0–Qmax that is accessed. Finally, a controller 340 is responsive to the respective word W0–Wmax that is accessed, and is configured to control access to the respective FIFO queue Q0–Qmax based upon at least one or more parameters that is stored in the respective word. It will be understood that the controller 340 may be embodied using special purpose hardware, a general purpose processor running a stored program and/or combinations thereof, and may be integrated into a single section of the integrated circuit substrate 310 or may be distributed over multiple sections of the integrated circuit substrate 310.

Still referring to FIG. 3, the words W0–Wmax of the register file 320 may store one or more parameters, such as counter parameters and/or flag parameters. More specifically, the one or more parameters may comprise a number of words read, a number of words written, a number of packets read, a number of packets written, a location of a next word to be read, a location of a next word to be written, a start address and/or an end address, for the respective queue Q0–Qmax. The one or more parameters also may comprise mask values that are used to generate a full, almost full and/or almost empty flag for the respective queue Q0–Qmax. It also will be understood that embodiments of FIG. 3 may be used in conjunction with a fixed number of FIFO queues Qmax, to store, for example, flag mask values for the fixed number of FIFO queues.

Figure 4:
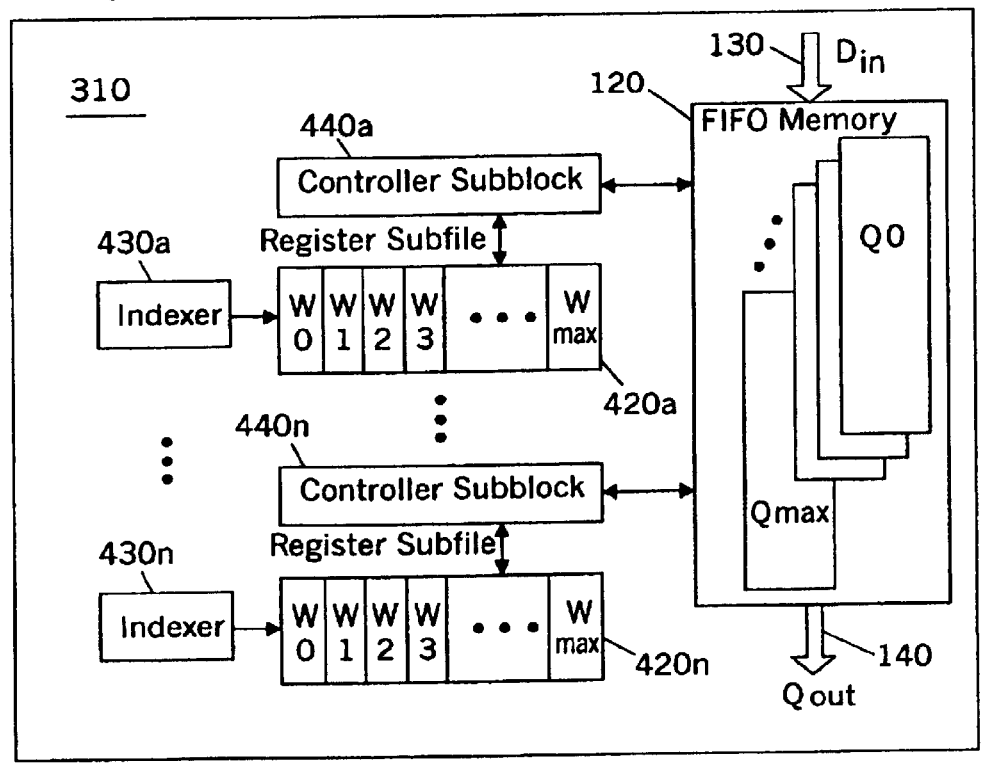

Referring now to FIG. 4, other embodiments of integrated circuit FIFO memory devices 400 according to the invention are shown. Rather than providing a single register file 320, as shown in FIG. 3, a plurality of register subfiles 420a–420n are provided, each of which includes the predetermined number of words Wmax, a respective word of which is configured to store one or more parameters for a respective one of the FIFO queues. As with the register file 320, any type of memory may be used. Multiple indexers or addressers 430a–430n may be provided. Alternatively, a single indexer may be used to index through each of the register subfiles 420a–420n simultaneously.

Still referring to FIG. 4, a plurality of controller subblocks 440a–440n are provided. A respective controller subblock 440a–440n is responsive to a respective word that is accessed in at least one of the register subfiles 420a–420n, and is configured to control access to the respective FIFO queue Q0–Qmax based upon at least one of the one or more parameters that is stored in the respective word W0–Wmax. It will be understood that in FIG. 4, a same number of register subfiles 420a–420n and controller subblocks 440a–440n is shown. However, in other embodiments, one controller subblock can control multiple register subfiles and/or multiple controller subblocks may be responsive to a single register subfile. The register subfiles may each store a single parameter or multiple parameters may be stored. Moreover, the controller subblocks 440a may be embodied using special purpose hardware, a general purpose processor running a stored program and/or combinations thereof, and may be integrated into a single section of the integrated circuit substrate 310 or may be distributed over multiple sections of the integrated circuit substrate. It also will be understood that embodiments of FIG. 4 may be used in conjunction with a fixed number of FIFO queues Qmax, to store, for example, flag mask values for the fixed number of FIFO queues.

As was already described, register files or subfiles are used to increment and store counts for all the queues in the integrated circuit FIFO memory. They can be used to store the number of words read, number of words written, number of packets read, number of packets written, memory location of the next word to be read, memory location of the next word to be written, and the constant values used for the flag decodes and memory operations for each queue. The use of the register file can allow almost infinite scalability in terms of the number of queues with a reduced or minimal increase in the amount of hardware that need be used. If separate counters were used to store counts and other information for each queue, then the amount of hardware that may be needed as the number of queues is increased may quickly become unmanageable. In contrast, in register files according to embodiments of the invention, an increase in the number of queues can be accommodated by adding more word lines to the register file. This can be similar to making a memory array deeper, and the consequences, such as speed, degradation, area, etc., can be analyzed in a manner similar to that of the conventional memory array.

Figure 5B:
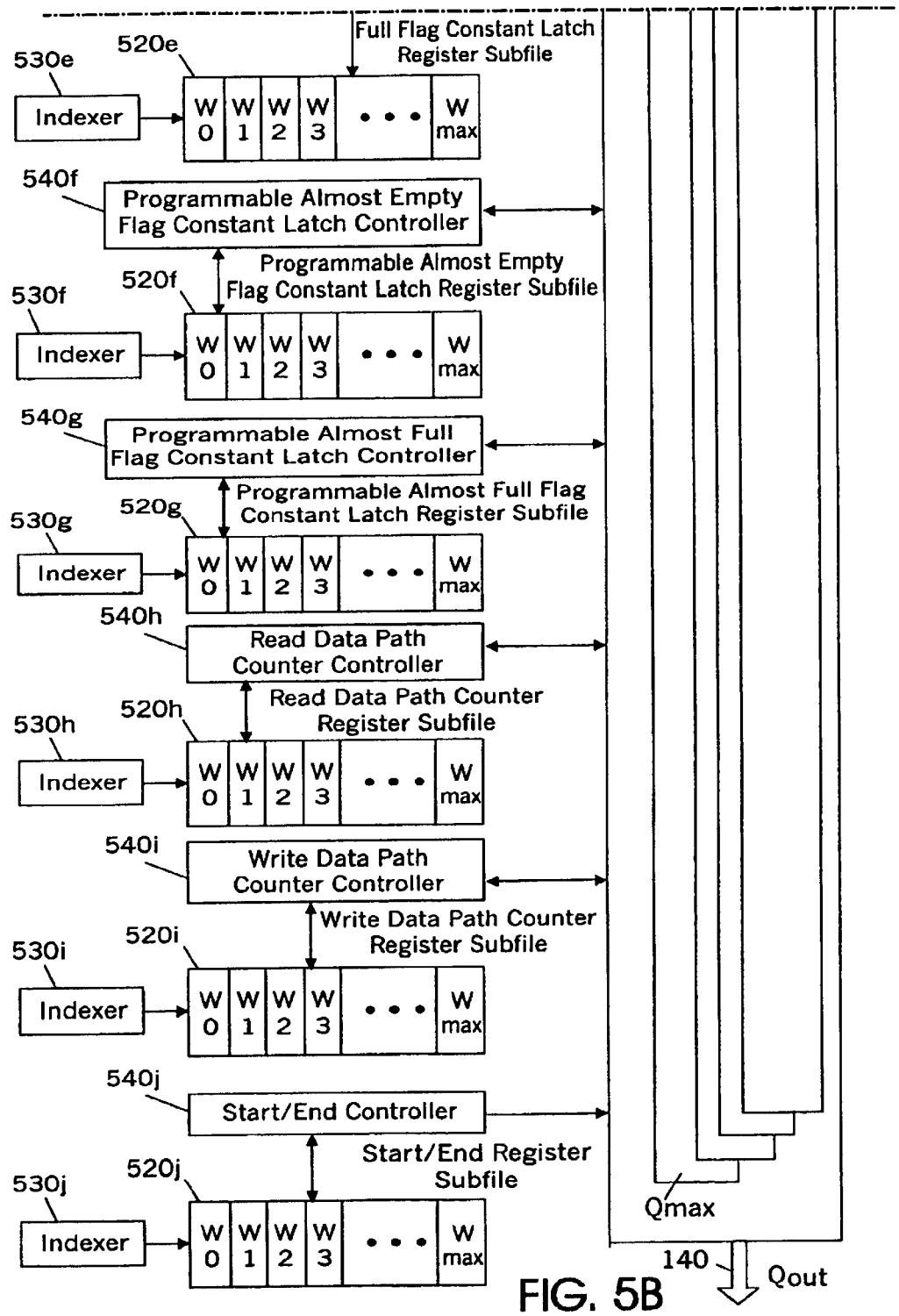

FIGS. 5A and 5B, which when placed together as shown form FIG. 5, are block diagrams of other embodiments of integrated circuit FIFO memory devices and methods according to the invention. In FIG. 5, ten separate sets of register subfiles 520a–520j, controller subblocks 540a–540j and indexers 530a–530j are provided.

In particular, referring to FIG. 5A, a Read Word Counter Register Subfile 520a is configured to store a number of words read for a respective one of the FIFO queues, and a Read Word Counter Controller 540a is configured to control reading from the respective FIFO queue based on the number of words read that is stored in the respective word of the Read Word Counter Register Subfile 520a. A Write Word Counter Register Subfile 520b is configured to store a number of words written into a respective one of the FIFO queues, and a Write Word Counter Controller subblock 540b is configured to control writing into the respective FIFO queue based on the number of words written that is stored in the respective word of the Write Word Counter Register Subfile 520b.

Still continuing with the description of FIG. 5A, a Read Packet Counter Register Subfile 520c stores a number of packets read for a respective one of the FIFO queues, and a Read Packet Counter Controller 540c is configured to control reading from the respective FIFO queue based upon the number of packets read that is stored in the respective word. A Write Packet Counter Register Subfile 520d is configured to store a number of packets written into a respective one of the FIFO queues, and Write Packet Counter Controller 540d is configured to control writing into the respective FIFO queue based upon the number of packets written that is stored in the respective word. A Full Flag Constant Latch Register Subfile 520e (FIG. 5B) is configured to store at least one mask value that is used to generate a full flag for a respective one of the FIFO queues, and an associated Full Flag Constant Latch Controller subblock 540e (FIG. 5A) is configured to control generating a full flag for the respective FIFO queue based upon the at least mask value that is stored in the respective word.

Referring now to FIG. 5B, a Programmable Almost Empty Flag Constant Latch Register Subfile 520f is configured to store at least one mask value that is used to generate a programmable almost empty flag for a respective one of the FIFO queues, and an associated Programmable Almost Empty Flag Constant Latch Controller 540f is configured to control generating a programmable almost empty flag for the respective FIFO queue. A Programmable Almost Full Flag Constant Latch Register Subfile 520g is configured to store at least one mask value that is used to generate a programmable almost full flag and a Programmable Almost Full Flag Constant Latch Controller subblock 540g is configured to control generating a programmable almost full flag for the respective FIFO queue.

Still continuing with the description of FIG. 5B, a Read Data Path Counter Register Subfile 520h is configured to store a physical memory location of the next word to be read for a respective one of the FIFO queues and an associated Read Data Path Counter Controller 540h is configured to control reading from the respective FIFO queue based upon the physical memory location of a next word to be read. A Write Data Path Counter Register Subfile 520i is configured to store a physical memory location of a next word to be written for a respective one of the FIFO queues, and a Write Data Path Counter Controller 540i is configured to control writing into the respective FIFO queue based upon the physical memory location of a next word to be written that is stored in the respective word. Finally a Start/End Register Subfile 520j is configured to store physical memory locations of a start and an end of a respective one of the FIFO queues, and a Start/End Controller 540j is configured to control reading from and writing to the respective FIFO queue based upon the physical memory locations of a start and an end that is stored in the respective word.

It will be understood in other embodiments of FIG. 5 that one or more of the register subfiles 520a–520j may be combined, the functionality of one or more of the controllers 540a–540j may be combined and the functionality of one or more of the indexers 540a–530j may be combined. Moreover, the indexers, register subfiles and controller blocks may be embodied in many forms, as already was described in connection with FIGS. 3–4. It also will be understood that embodiments of FIG. 5 may be used in conjunction with a fixed number of FIFO queues Qmax, to store, for example, flag mask values for the fixed number of FIFO queues.

FIGS. 6–9 illustrate other embodiments of register subfiles, indexers and controller subblocks according to the present invention. Embodiments of FIG. 6 may be used, for example, for the Read Word Counter Controller 540a and associated Register Subfile 520a, the Write Word Counter Controller 540b and associated Register Subfile 520b, the Read Packet Counter Controller 540c and associated Register Subfile 520c, and the Write Packet Counter Controller 540d and associated Register Subfile 520d of FIG. 5. Embodiments of FIG. 7 may be employed for the Full Flag Constant Latch Controller 540e and associated Register Subfile 520e, the Programmable Almost Empty Flag Constant Latch Controller 540f and associated Register Subfile 520f and the Programmable Almost Full Flag Constant Latch Controller 540g and associated Register Subfile 520g. Embodiments of FIG. 8 may be used for the Read Path Data Counter Controller 540h and associated Register Subfile 520h and the Write Data Path Counter Controller 540i and associated Register Subfile 520i. Finally, embodiments of FIG. 9 may be used for the Start/End Controller 540j and associated Register Subfile 520j of FIG. 5.

Figure 6:
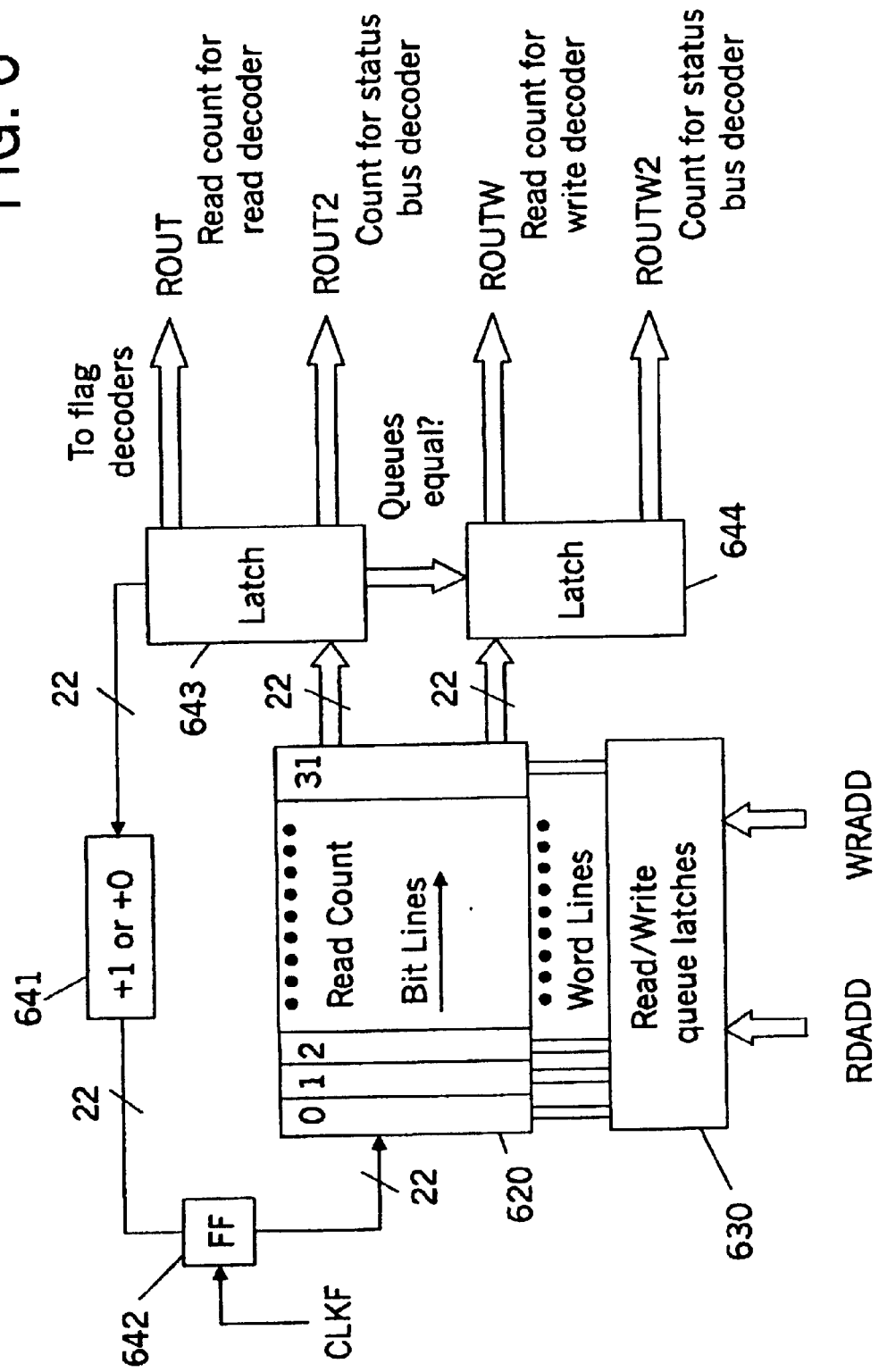

FIG. 6 is a block diagram of a read word counter register subfile, indexer and read word counter controller, such as shown at 520a, 530a and 540a, respectively, in FIG. 5A. However, the same architecture may be used for the write word counter, read packet counter and write packet counter. Referring to FIG. 6, the read word counter register subfile 620, also referred to as a register file 620, is indexed or addressed by Read/Write queue latches 630, which store read and write addresses for the memory and activate the appropriate word lines. The controller may include latches 643 and 644, a flip-flop 642 and an incrementer 641. The latches 643 and 644 can store the read count that is provided for the read decoders, the write decoders and the status bus decoders. The incrementer 641 can increment the count after a read, as necessary, based on the state of the flip-flop 642.

Thus, two sets of counts may be output from the counter at any time. One set is for the queue that is active on the read side and one is for the queue that is active on the write side. If the queue that is active on the read side is different from the queue that is active on the write side, two independent reads occur from the register file, one based on each clock. The outputs for the queue active on the write side only need to be updated on a write queue switch, since the read side does not update the count value if the read and write queues are not equal. If the queues are equal, then the output for the active queue on the read side may need to be connected transparently to the output for the active queue on the write side to realize single FIFO operation.

A clock initiates all processes in the read counter. The clock toggles if a word is read or if a queue switch is performed on the read side. If either the queue that is being switched from (old queue) or the queue that is being switched to (new queue) is empty, then a signal is set to HIGH for the appropriate cycles to avoid incrementing the count in the absence of additional reads. This may be different from conventional FIFOs because in conventional FIFOs the clock can be suppressed whenever the FIFO is empty. However, in embodiments of the invention, the clock may need to toggle on a queue switch in order to read out the count value of the new queue for the flag decoders. Thus, an extra signal may be used to enable or disable incrementing of the count.

At the beginning of every clock cycle, the new value of count (+1 or +0) is clocked out of the flip-flop 642 and written into the register file 620. After this, the new value of count is read out from the register file 620 and is latched into one of the output latches 643, 644. The output latches also handle any multiplexing that is performed during a queue switch, where the count value for the old queue is updated into the register file 620 while the count value of the new queue is read into the output latches 643, 644, and the additional pipe stages for the count values used by the status bus flag decoders. The outputs of these latches 643, 644 are connected to the various flag decoders. The output latch 643 also provide inputs to the incrementer 641 in the counter, the output of which then sets up the input to the flip-flop 642 to prepare for the next cycle. Thus, the new count is written into the register file 620 before it can be accessed for use by the flag decoders.

The register file 620 is organized as a memory array and is thirty-two words by twenty-two bits wide. Each word in the file stores the count value for one queue with word zero containing the count for queue zero and so on up to queue thirty-one. The queue address comes into the counter in decoded form, i.e., it is a thirty-two bit bus in which one of the bits is high at a time.

Figure 10:
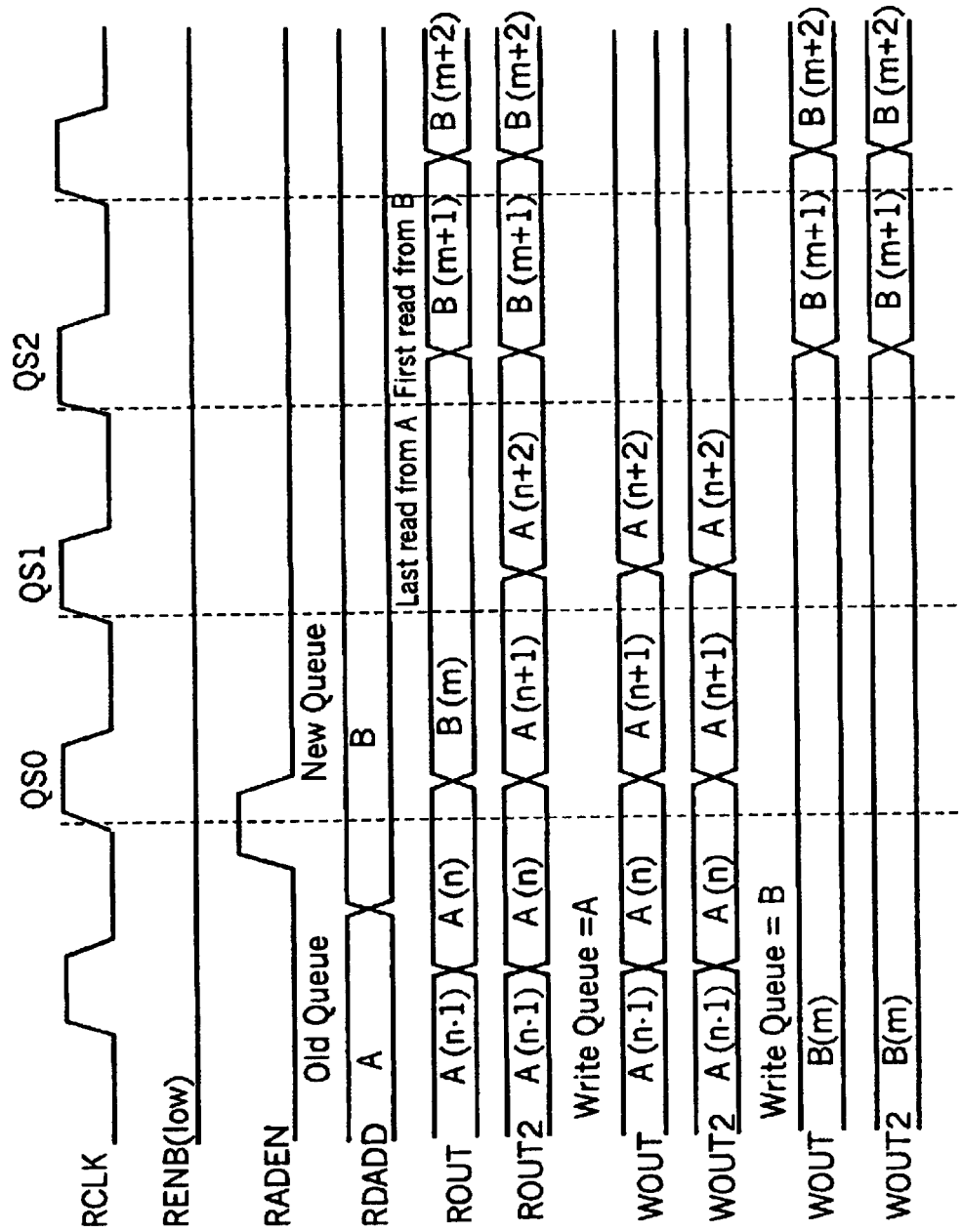
FIGS. 10–12 are timing diagrams of operations of integrated circuit FIFO memory devices and methods according to embodiments of the invention.

FIG. 10 is a timing diagram illustrating operations of embodiments of FIG. 6. Referring to FIGS. 6 and 10, during non queue-switching operation, the outputs of the latches 643, 644 are fed back into the incrementer 641, the output of which is connected to the input flip-flop 642. During QS0 the output of the input flip-flop 642 is fed directly into the incrementer 641 without going through the register file 620. This is because in QS0, the count value for the new queue is fetched from the register file 620 to be fed to the flag decoders. At the same time reads (or writes) can occur from the old queue in QS1, necessitating an increment of the count value for that queue. Since data is not read (or written) from the new queue until QS2, the count value for the new queue does not need to be incremented until that cycle. The output of the input flip-flop 642 is also connected to another set of latches (ROUT2), which are enabled by a signal similar to the one that enables the ROUT latches. One of the uses of this ROUT2 port is to provide count values to the flag decoders that supply flag outputs to the status bus. Since the count value of the old queue may need to be updated in QS1, the flag decoders for the status bus may not switch over to the new queue until QS2 to guarantee that the most up to date value of the flag is stored in the status bus block. Another use of the ROUT2 port is to provide a path for the active read queue count to be connected to the active write queue count when the read and write queues are equal.

When the read and write queues are not equal, the read count value for the active queue on the write side is fetched from the read counter register file 620 based on the rising edge of WCLK. This may be performed via a conditional discharge into latches. However, the read count for the write side may need to be fetched only on a queue switch since this value does not get updated if the read and write queues are not equal.

WCLKQSX (write queue switch clock) is used to fetch the count from the register file. Again, there are two output ports for the queue that is active on the write side. One output port (WOUT) provides the read count value for the PAF and FF flags for the active write queue and the other port (WOUT2) provides the read count value for the status bus flags. On a write queue switch WOUT2 switches to the new queue two cycles after WOUT because of the same considerations as with ROUT2. This may be accomplished by inserting two stages of flip-flops between WOUT and WOUT2. When the read and write side active queues become equal, the write clock may not be used to fetch the read count from the register file. This is because the validity of the count value in the register file may not be guaranteed when the write clock issues a fetch because of the asynchronous nature of the read clock with respect to the write clock, and since it is the read clock that updates the count value in the register file. Thus, the read count value fetched by the read clock may need to be connected to the outputs that connect to the flag decoders for the write side as well. Again, this transparent operation between the read and the write output ports may be implemented while making sure that the WOUT2 ports switch to the new queue two cycles after the switch in WOUT.

Figure 7:
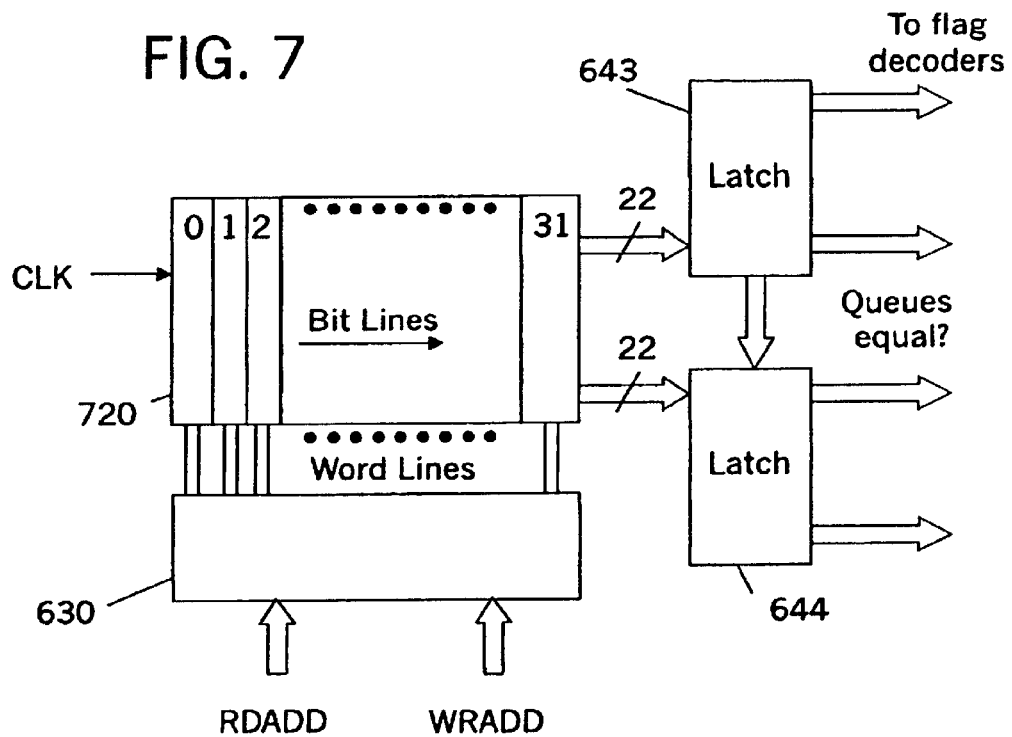

Referring now to FIG. 7, a block diagram of embodiments of a constant latch register file and constant latch decoder, for example that may be used for the full flag, programmable almost empty flag and programmable almost full flag of FIG. 5B, is shown. As shown in FIG. 7, the constant latch register file 720 that is used to store the programmable almost empty flag, the programmable almost full flag and the full flag mask values can be similar to embodiments of FIG. 6. A primary difference is that the constant latches do not require an incrementer 641, since they are only used to store constants. Also, the register subfile in these latches is written into during serial programming with the clock queue address and masked data coming from the serial program block. The output ports of these latches may be disabled if default programming is selected, and the default registers are used to drive the masked value busses. These default registers generate the mask values based on the default setting and the depth of each queue. Data is only read from the constant latches during a queue switch. A clock is used to turn on the read word lines in the register file in the same manner as is the case in the counters of FIG. 6.

Figure 8:
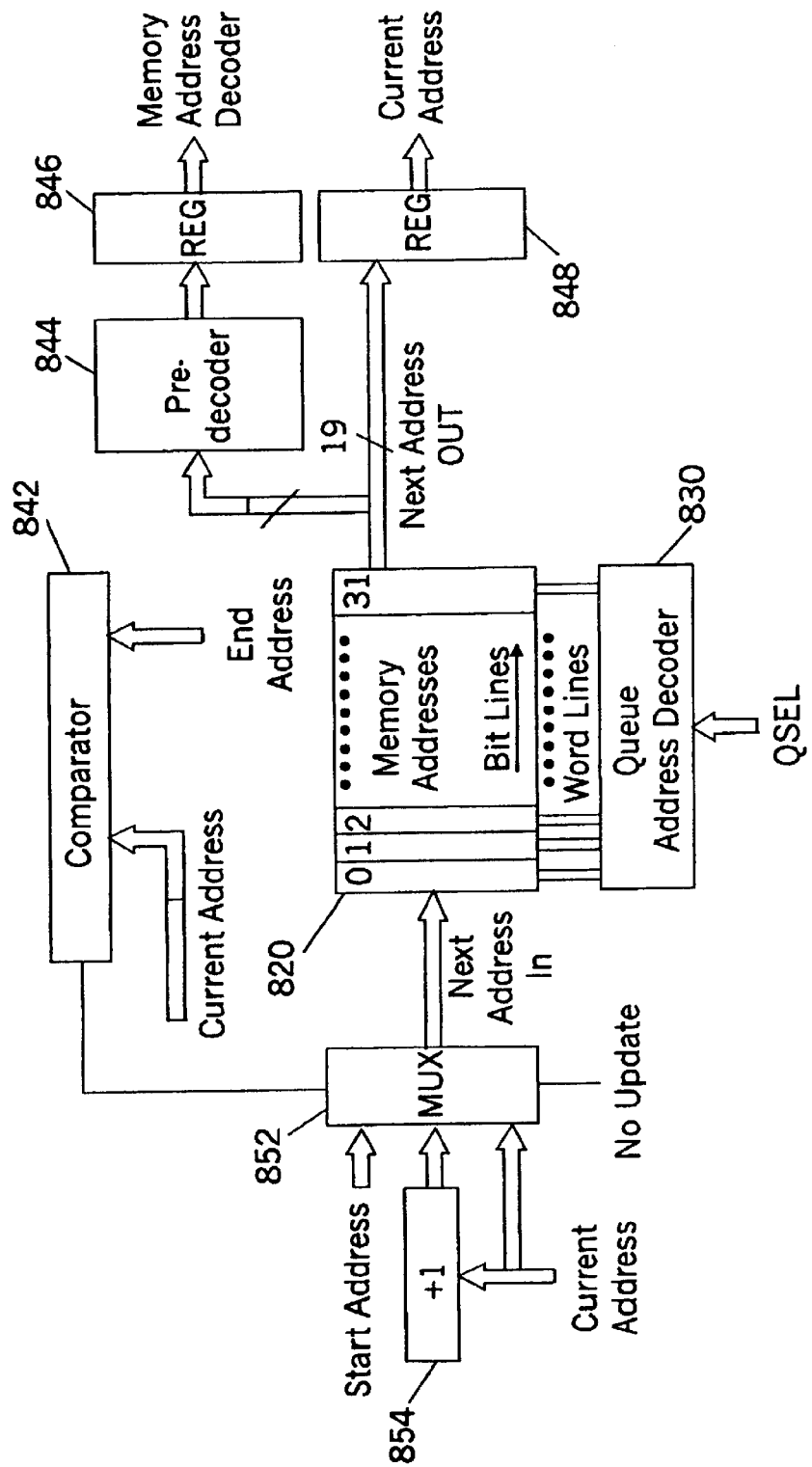

FIG. 8 is a block diagram of a data path register file and data path controller, that may be used for the read data path counter register subfile 520h and the write data path counter register subfile 520i and the associated controllers 540h, 540i of FIG. 5B. As shown in FIG. 8, the read or write data path counter register subfile 820 is indexed into by a queue address decoder 830 which functions as an indexer. A controller, such as the read data path counter controller 540h or the write data path counter controller 540i can include a comparator 842, a predecoder 844, registers 846 and 848, a multiplexer 852 and a start address latch 854.

Figure 11:
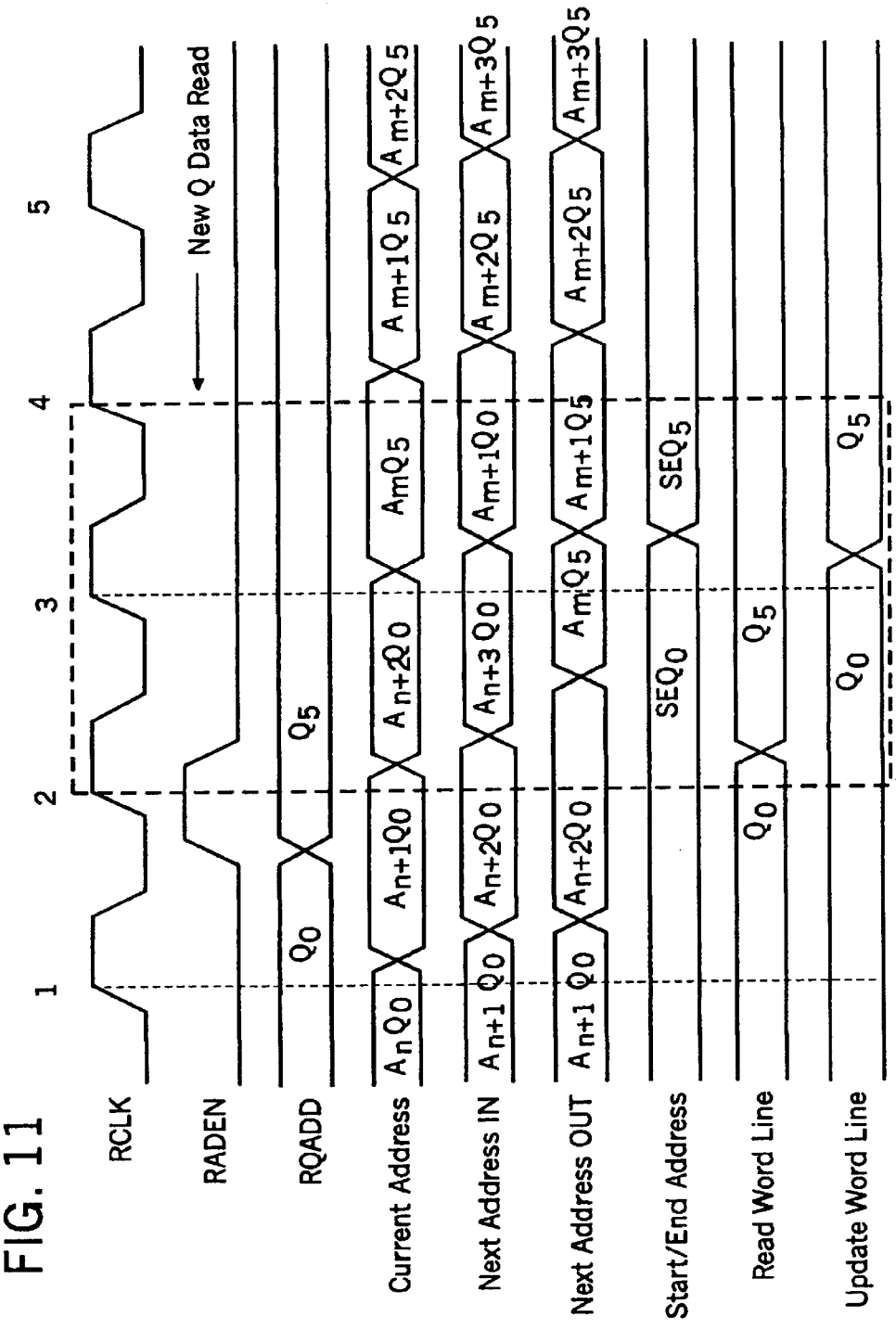
Figure 12:
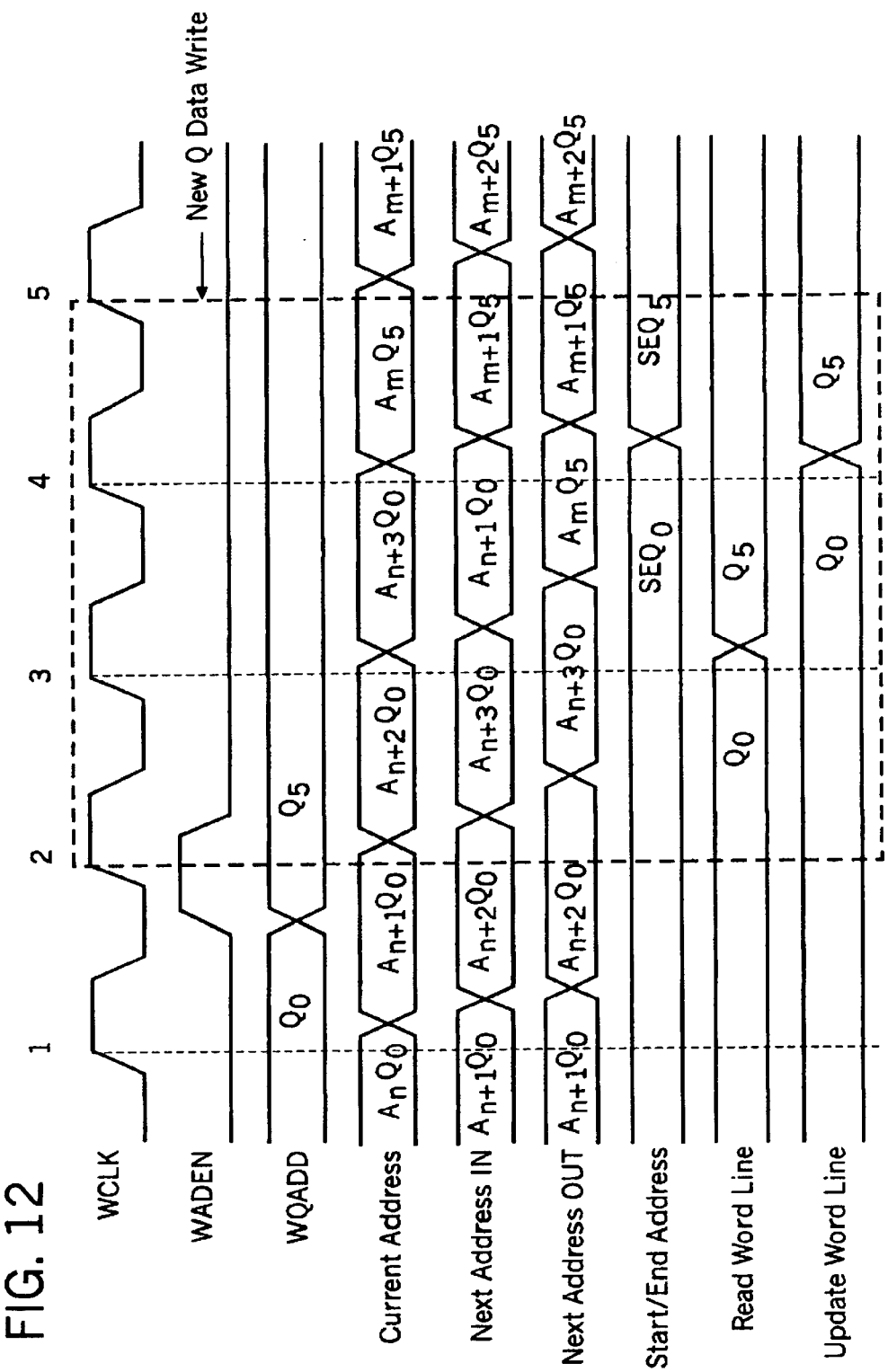

At the beginning of each cycle, the current address of a selected queue is compared with the end address in the comparator 842, to determine if the counter for that queue has reached the allowed memory boundary. If that is true, the next address in will be the start address. Otherwise, the next address in is either the current address plus one or plus zero, depending on the flags. However, if the previous queue was empty or the last word from the previous queue was already read out, then the address counter may not need to be incremented. The counter is clocked to read out addresses for the new queue. The addressing coming out of the predecoder 844 in register 846, is applied to the physical memory. The queue address decoder 830 ensures only the selected column is turned on to perform the update and read operation in the counter memory. The next address out is equal to next address in if there is no queue switch. During the queue switch, the next address out will be the counter address for the new queue, with the counter updating the address for the old queue. The next address out is used to predecode the quad bank, for write toggle selection and for local and global word lines. FIGS. 11 and 12 are the timing diagrams for the read and write address counters, respectively.

Figure 9:
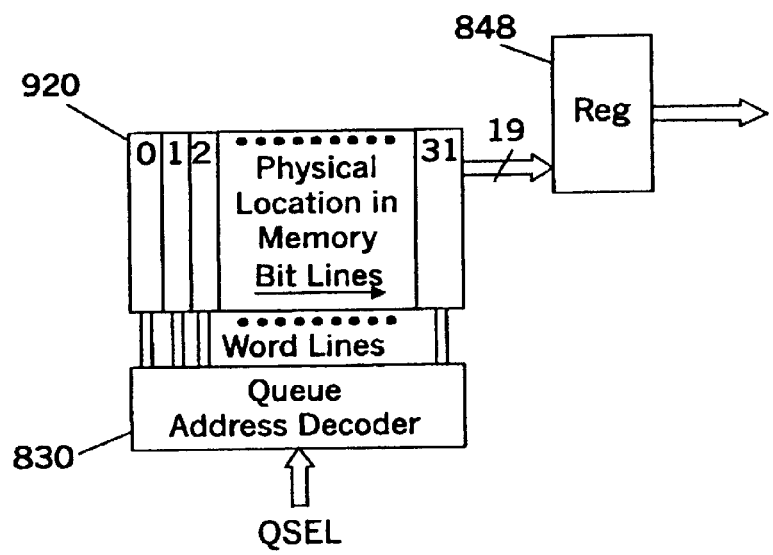

Referring now to FIG. 9, an embodiment of a start/end register subfile 520j and a start/end controller 540j of FIG. 5B now will be described. As shown in FIG. 9, the register subfile 920 can be similar to that shown in FIG. 8, except that because physical locations in memory are stored, many of the elements of FIG. 8 need not be used. Thus, the start/end register subfile 920 contains physical locations of the start and end of the queue. A comparator 842, multiplexer 852 and predecoder 844 need not be used, because absolute addresses are stored.

Figure 14:
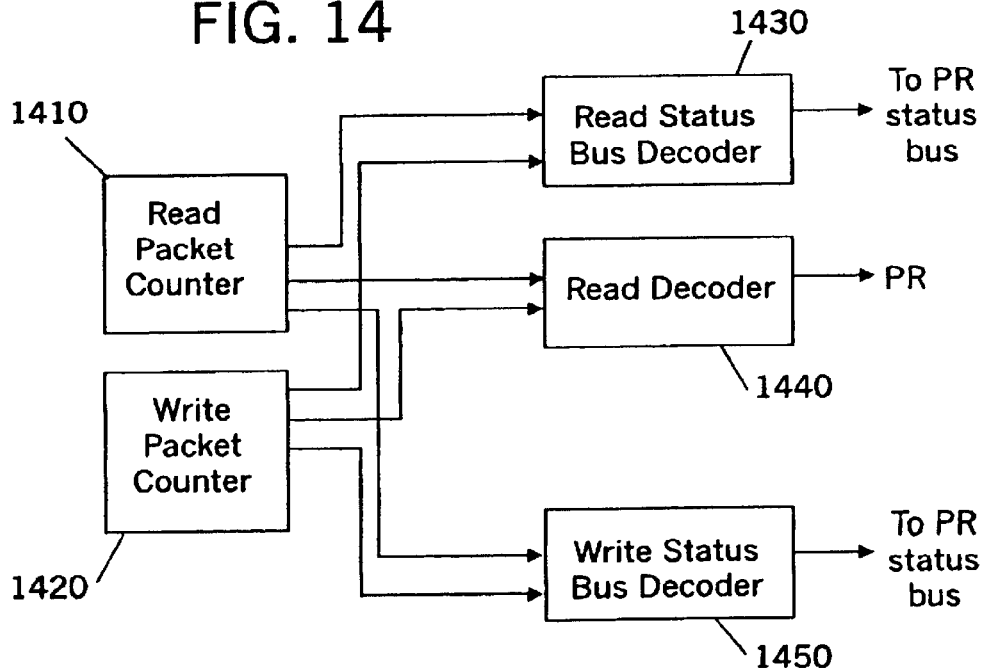
Figure 13:
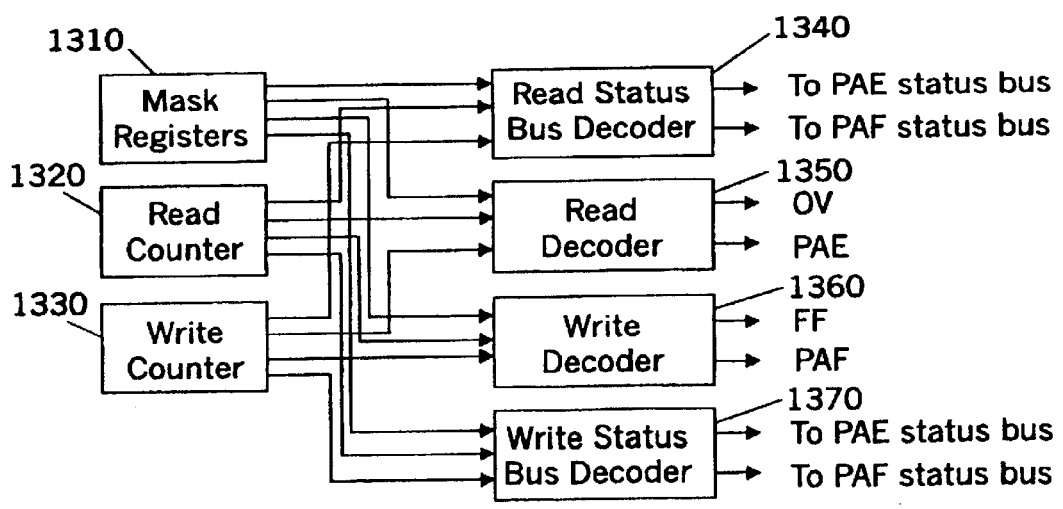

FIGS. 13 and 14 are block diagrams illustrating how register files according to embodiments of the present invention can be integrated into decoding circuitry that is conventionally used in an integrated circuit FIFO memory device, according to embodiments of the invention. As shown in FIG. 13, mask registers 1310, such as the full flag constant latch register subfile 520e, full flag constant latch controller 540e, programmable almost empty flag constant latch register subfile 520f, programmable almost empty constant latch controller 540f, programmable almost full flag constant latch register subfile 520g and programmable almost full flag constant latch controller 540g of FIG. 5B, may constitute the mask registers 1310 of FIG. 13. The read counter 1320 may be embodied as the read word counter register subfile 520a, read word counter controller 540a of FIG. 5A, and the write counter 1330 may be embodied as the write word counter register subfile 520b and the write word counter controller 540b of FIG. 5A. The read counter 1320 also may be embodied as the read data path counter register subfile 520h and the read data path counter controller 540h of FIG. 5B, and the write counter 1330 also may be embodied in the write data path counter register subfile 520i and the write data path counter controller 540i of FIG. 5B.

The outputs of the mask registers 1310, read counter 1320 and write counter 1330 may be applied to a conventional read status bus decoder 1340, a conventional read decoder 1350, a conventional write decoder 1360 and a conventional write status bus decoder 1370, as shown in FIG. 13, to generate programmable almost empty, programmable almost full, empty, full, flag and full flags and status signals.

FIG. 14 illustrates a read packet counter 1410 which may be embodied as a read packet counter register subfile 520c and a read packet counter controller 540c of FIG. 5A, and a write packet counter 1420, which may be embodied as a write packet counter register subfile 520d and a write packet counter controller 540d of FIG. 5A. As shown in FIG. 14, the outputs of these counters 1410 and 1420 can be applied to a conventional read status bus decoder 1430, a conventional read decoder 1440 and a conventional write status bus decoder 1450, to generate packet read status signals. Thus, the decoders of FIGS. 13 and 14 may operate as if they were working with a single FIFO, and need not have knowledge as to which of the programmable independent FIFO queues is active.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An integrated circuit First-In-First-Out (FIFO) memory device comprising:
   a FIFO memory that is divisible into up to a predetermined number of independent FIFO queues;
   a register file including the predetermined number of words, a respective word of which is configured to store one or more parameters for a respective one of the FIFO queues;
   an indexer that is configured to index into the register file to access a respective word that corresponds to a respective FIFO queue that is accessed; and
   a controller that is responsive to the respective word that is accessed and that is configured to control access to the respective FIFO queue based upon at least one of the one or more parameters that is stored in the respective word.

2. An integrated circuit FIFO memory device according to claim 1 wherein the one or more parameters comprise count parameters and/or flag parameters.

3. An integrated circuit FIFO memory device according to claim 1 wherein the one or more parameters comprise a number of words read, a number of words written, a number of packets read, a number of packets written, a location of a next word to be read, a location of a next word to be written, a start address and/or an end address for the respective queue.

4. An integrated circuit FIFO memory device according to claim 1 wherein the one or more parameters comprise mask values that are used to generate a full, almost full and/or almost empty flag for the respective queue.

5. An integrated circuit FIFO memory device according to claim 1:
   wherein the register file comprises a plurality of register subfiles, each of which includes the predetermined number of words, a respective word of which is configured to store one or more parameters for a respective one of the FIFO queues; and
   wherein the controller comprises a plurality of controller subblocks, a respective one of which is responsive to the respective word that is accessed in at least one of the register subfiles and that is configured to control access to the respective FIFO queue based upon at least one of the one or more parameters that is stored in the respective word.

6. An integrated circuit FIFO memory device according to claim 1:
wherein the register file comprises a read word counter register subfile including the predetermined number of words, a respective word of which is configured to store a number of words read for a respective one of the FIFO queues; and
wherein the controller comprises a read word counter controller subblock that is responsive to the respective word that is accessed in the read word counter register subfile and that is configured to control reading from the respective FIFO queue based upon the number of words read that is stored in the respective word.

7. An integrated circuit FIFO memory device according to claim 1:
wherein the register file comprises a write word counter register subfile including the predetermined number of words, a respective word of which is configured to store a number of words written into a respective one of the FIFO queues; and
wherein the controller comprises a write word counter controller subblock that is responsive to the respective word that is accessed in the write word counter register subfile and that is configured to control writing into the respective FIFO queue based upon the number of words written that is stored in the respective word.

8. An integrated circuit FIFO memory device according to claim 1:
wherein the register file comprises a read packet counter register subfile including the predetermined number of words, a respective word of which is configured to store a number of packets read for a respective one of the FIFO queues; and
wherein the controller comprises a read packet counter controller subblock that is responsive to the respective word that is accessed in the read packet counter register subfile and that is configured to control reading from the respective FIFO queue based upon the number of packets read that is stored in the respective word.

9. An integrated circuit FIFO memory device according to claim 1:
wherein the register file comprises a write packet counter register subfile including the predetermined number of words, a respective word of which is configured to store a number of packets written into a respective one of the FIFO queues; and
wherein the controller comprises a write packet counter controller subblock that is responsive to the respective word that is accessed in the write packet counter register subfile and that is configured to control writing into the respective FIFO queue based upon the number of packets written that is stored in the respective word.

10. An integrated circuit FIFO memory device according to claim 1:
wherein the register file comprises a full flag constant latch register subfile including the predetermined number of words, a respective word of which is configured to store at least one mask value that is used to generate a full flag for a respective one of the FIFO queues; and
wherein the controller comprises a full flag constant latch controller subblock that is responsive to the respective word that is accessed in the read word counter register subfile and that is configured to control generating a full flag for the respective FIFO queue based upon the at least one mask value that is stored in the respective word.

11. An integrated circuit FIFO memory device according to claim 1:
wherein the register file comprises a programmable almost full flag constant latch register subfile including the predetermined number of words, a respective word of which is configured to store at least one mask value that is used to generate a programmable almost full flag for a respective one of the FIFO queues; and
wherein the controller comprises a programmable almost full flag constant latch controller subblock that is responsive to the respective word that is accessed in the read word counter register subfile and that is configured to control generating a programmable almost full flag for the respective FIFO queue based upon the at least one mask value that is stored in the respective word.

12. An integrated circuit FIFO memory device according to claim 1:
wherein the register file comprises a programmable almost empty flag constant latch register subfile including the predetermined number of words, a respective word of which is configured to store at least one mask value that is used to generate a programmable almost empty flag for a respective one of the FIFO queues; and
wherein the controller comprises a programmable almost empty flag constant latch controller subblock that is responsive to the respective word that is accessed in the read word counter register subfile and that is configured to control generating a programmable almost empty flag for the respective FIFO queue based upon the at least one mask value that is stored in the respective word.

13. An integrated circuit FIFO memory device according to claim 1:
wherein the register file comprises a read data path counter register subfile including the predetermined number of words, a respective word of which is configured to store a physical memory location of a next word to be read for a respective one of the FIFO queues; and
wherein the controller comprises a read data path counter controller subblock that is responsive to the respective word that is accessed in the read data path counter register subfile and that is configured to control reading from the respective FIFO queue based upon the physical memory location of a next word to be read that is stored in the respective word.

14. An integrated circuit FIFO memory device according to claim 1:
wherein the register file comprises a write data path counter register subfile including the predetermined number of words, a respective word of which is configured to store a physical memory location of a next word to be written for a respective one of the FIFO queues; and
wherein the controller comprises a write data path counter controller subblock that is responsive to the respective word that is accessed in the write data path counter register subfile and that is configured to control writing into the respective FIFO queue based upon the physical memory location of a next word to be written that is stored in the respective word.

15. An integrated circuit FIFO memory device according to claim 1:
   wherein the register file comprises a start/end register subfile including the predetermined number of words, a respective word of which is configured to store physical memory locations of a start and an end of a respective one of the FIFO queues; and
   wherein the controller comprises a start/end controller subblock that is responsive to the respective word that is accessed in the start/end register subfile and that is configured to control reading from and writing to the respective FIFO queue based upon the physical memory locations of a start and an end that is stored in the respective word.

16. An integrated circuit FIFO memory device according to claim 1 wherein the indexer comprises a word address decoder.

17. An integrated circuit FIFO memory device according to claim 1 wherein the controller comprises an incrementer that is configured to selectively increment the one or more parameters.

18. An integrated circuit FIFO memory device according to claim 1 wherein the controller comprises a comparator that is configured to compare a current address to an end address and an incrementer that is configured to selectively increment the one or more parameters based on comparison results from the comparator.

19. An integrated circuit FIFO memory device according to claim 1 wherein the controller comprises at least one latch that is configured to latch at least one of the one or more parameters for the respective FIFO queue.

20. An integrated circuit FIFO memory device according to claim 1 wherein the controller comprises at least one decoder that is responsive to the respective word that is accessed.

21. An integrated circuit First-In-First-Out (FIFO) memory device comprising:
   a FIFO memory;
   a data input port;
   a data output port;
   a FIFO controller that is configured to operate the FIFO memory as from one up to a predetermined number greater than one of independent FIFO queues;
   a data input system that is configured to write input data from the input port into a first selected one of the independent FIFO queues; and
   a data output system that is configured to read data from a second selected one of the independent FIFO queues.

22. An integrated circuit FIFO memory device according to claim 21 wherein the FIFO controller stores therein one or more parameters for each of the up to a predetermined number of independent FIFO queues and is configured to control writing of the input data into the first selected one of the independent FIFO queues based upon at least one of the one or more parameters that is stored for the first selected one of the independent FIFO queues and to control reading of data from the second selected one of the independent FIFO queues based upon at least one of the one or more parameters that is stored for the second selected one of the independent FIFO queues.

23. An integrated circuit FIFO memory device according to claim 21 wherein the one or more parameters comprise a number of words read, a number of words written, a number of packets read, a number of packets written, a location of a next word to be read, a location of a next word to be written, a start address and/or an end address for the respective FIFO queue.

24. An integrated circuit FIFO memory device according to claim 21 wherein the one or more parameters comprise mask values that are used to generate a full, almost full and/or almost empty flag for the respective FIFO queue.

25. An integrated circuit FIFO memory device according to claim 21 wherein the first and second selected ones of the independent FIFO queues are different ones of the independent FIFO queues.

26. An integrated circuit FIFO memory device according to claim 21 wherein the FIFO controller comprises:
   a register file including the predetermined number of words, a respective word of which is configured to store one or more parameters for a respective one of the FIFO queues;
   an indexer that is configured to index into the register file to access a respective word that corresponds to a respective FIFO queue that is accessed; and
   wherein the controller is responsive to the respective word that is accessed and is configured to control access to the respective FIFO queue based upon at least one of the one or more parameters that is stored in the respective word.

27. An integrated circuit FIFO memory device according to claim 21 wherein the FIFO memory comprises an embedded memory device and a multi-port cache memory device.

28. An integrated circuit First-In-First-Out (FIFO) memory device comprising:
   a FIFO memory including a predetermined number, greater than one of FIFO queues;
   a register file including the predetermined number of words, a respective word of which is configured to store one or more parameters for a respective one of the FIFO queues;
   an indexer that is configured to index into the register file to access a respective word that corresponds to a respective FIFO queue that is accessed; and
   a controller that is responsive to the respective word that is accessed and that is configured to control access to the respective FIFO queue based upon at least one of the one or more parameters that is stored in the respective word.

29. An integrated circuit FIFO memory device according to claim 28 wherein the one or more parameters comprise count parameters and/or flag parameters.

30. An integrated circuit FIFO memory device according to claim 28 wherein the one or more parameters comprise a number of words read, a number of words written, a number of packets read, a number of packets written, a location of a next word to be read, a location of a next word to be written, a start address and/or an end address for the respective queue.

31. An integrated circuit FIFO memory device according to claim 28 wherein the one or more parameters comprise mask values that are used to generate a full, almost full and/or almost empty flag for the respective queue.

32. An integrated circuit FIFO memory device according to claim 28:
   wherein the register file comprises a plurality of register subfiles, each of which includes the predetermined number of words, a respective word of which is configured to store one or more parameters for a respective one of the FIFO queues; and
   wherein the controller comprises a plurality of controller subblocks, a respective one of which is responsive to the respective word that is accessed in at least one of the register subfiles and that is configured to control access to the respective FIFO queue based upon at least one of the one or more parameters that is stored in the respective word.

33. A method of operating an integrated circuit First-In-First-Out (FIFO) memory device including a FIFO memory containing a predetermined number of independent FIFO queues, the method comprising:

indexing into a register file that includes the predetermined number of words, a respective word of which is configured to store one or more parameters for a respective one of the FIFO queues, to access a respective word that corresponds to a respective FIFO queue that is accessed; and controlling access to the respective FIFO queue based upon at least one of the one or more parameters that is stored in the respective word that is accessed.

34. A method according to claim 33 wherein the one or more parameters comprise count parameters and/or flag parameters.

35. A method according to claim 33 wherein the one or more parameters comprise a number of words read, a number of words written, a number of packets read, a number of packets written, a location of a next word to be read, a location of a next word to be written, a start address and/or an end address for the respective queue.

36. A method according to claim 33 wherein the one or more parameters comprise mask values that are used to generate a full, almost full and/or almost empty flag for the respective queue.

37. A method according to claim 33:

wherein the indexing comprises indexing into a plurality of register subfiles, each of which includes the predetermined number of words, a respective word of which is configured to store one or more parameters for a respective one of the FIFO queues.

38. A method according to claim 33 wherein the controlling comprises selectively incrementing the one or more parameters.

39. A method according to claim 33 wherein the controlling comprises comparing a current address to an end address and selectively incrementing the one or more parameters based on the comparing.

40. A method according to claim 33 wherein the indexing is preceded by:

dividing the FIFO memory into up to the predetermined number of independent FIFO queues.

* * * * *